United States Patent
Gueron et al.

(10) Patent No.: US 8,144,864 B2
(45) Date of Patent: Mar. 27, 2012

(54) METHOD FOR SPEEDING UP THE COMPUTATIONS FOR CHARACTERISTIC 2 ELLIPTIC CURVE CRYPTOGRAPHIC SYSTEMS

(75) Inventors: Shay Gueron, Haifa (IL); Michael Kounavis, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1123 days.

(21) Appl. No.: 11/966,572

(22) Filed: Dec. 28, 2007

(65) Prior Publication Data

US 2010/0020965 A1 Jan. 28, 2010

(51) Int. Cl.
*H04K 1/00* (2006.01)
*H04L 9/00* (2006.01)
*H04L 9/28* (2006.01)
*H04L 9/30* (2006.01)
*H04L 9/32* (2006.01)

(52) U.S. Cl. .............. 380/28; 380/29; 380/30; 713/174
(58) Field of Classification Search .............. 380/28–30; 713/174
See application file for complete search history.

(56) References Cited

U.S. PATENT DOCUMENTS

| | | | | |
|---|---|---|---|---|
| 5,847,981 | A * | 12/1998 | Kelley et al. .................. | 708/603 |
| 6,356,636 | B1 * | 3/2002 | Foster et al. ................... | 380/30 |
| 6,671,709 | B2 * | 12/2003 | Glaser et al. .................. | 708/492 |
| 7,124,351 | B2 * | 10/2006 | Aldridge et al. .............. | 714/781 |
| 7,447,310 | B2 * | 11/2008 | Koc et al. ...................... | 380/28 |
| 7,860,911 | B2 * | 12/2010 | Stribaek et al. ............... | 708/209 |
| 7,904,719 | B2 * | 3/2011 | Dror et al. ..................... | 713/174 |
| 7,986,779 | B2 * | 7/2011 | Ozturk et al. .................. | 380/30 |
| 2002/0021803 | A1 * | 2/2002 | Solinas .......................... | 380/30 |
| 2003/0009503 | A1 * | 1/2003 | Glaser et al. .................. | 708/625 |
| 2003/0044004 | A1 * | 3/2003 | Blakley et al. ................ | 380/28 |
| 2003/0059043 | A1 * | 3/2003 | Okeya ............................ | 380/30 |
| 2003/0140078 | A1 * | 7/2003 | Feuser ........................... | 708/492 |
| 2003/0208518 | A1 * | 11/2003 | Gura et al. .................... | 708/492 |
| 2003/0212729 | A1 * | 11/2003 | Eberle et al. .................. | 708/625 |
| 2004/0096057 | A1 * | 5/2004 | Moore ............................ | 380/28 |

(Continued)

OTHER PUBLICATIONS

Groszchaeldl J., Kamendje G.: Instruction set for fast elliptic curve cryptography over binary finite fields GF (2m), 2003, IEEE, Proceedings of the Application Specific systems Architectures and Processors.*

(Continued)

*Primary Examiner* — Carl Colin
*Assistant Examiner* — Catherine Thiaw
(74) *Attorney, Agent, or Firm* — Blakely, Sokoloff, Taylor & Zafman LLP

(57) ABSTRACT

In some embodiments, an apparatus and method for speeding up the computations for characteristic 2 elliptic curve cryptographic systems are described. In one embodiment, a multiplication routine may be pre-computed using a one iteration graph-based multiplication according to an input operand length. Once pre-computed, the multiplication routine may be followed to compute the products of the coefficients of the polynomials representing a carry-less product of two input operands using a carry-less multiplication instruction. In one embodiment, the pre-computed multiplication routines may be used to extend a carry-less multiplication instruction available from an architecture according to an input operand length of the two input operands. Once computed, the carry-less product polynomial produces a remainder when the product is computed modulo a programmable polynomial that defines the elliptic cryptographic system to form a cryptographic key. Other embodiments are described and claimed.

18 Claims, 14 Drawing Sheets

Selected subgraphs and their associated scalar products

U.S. PATENT DOCUMENTS

| | | | |
|---|---|---|---|
| 2006/0045262 A1* | 3/2006 | Orlando | 380/28 |
| 2006/0282743 A1* | 12/2006 | Kounavis | 714/758 |
| 2006/0285682 A1* | 12/2006 | Sarangarajan et al. | 380/28 |
| 2007/0297601 A1* | 12/2007 | Hasenplaugh et al. | 380/28 |
| 2008/0037787 A1* | 2/2008 | Boynton et al. | 380/270 |
| 2008/0109501 A1* | 5/2008 | Douguet et al. | 708/250 |
| 2008/0215658 A1* | 9/2008 | Gura et al. | 708/492 |
| 2009/0006517 A1* | 1/2009 | Gopal et al. | 708/492 |
| 2009/0285386 A1* | 11/2009 | Takashima | 380/28 |
| 2010/0023572 A1* | 1/2010 | Dupaquis et al. | 708/492 |
| 2010/0067690 A1* | 3/2010 | Han et al. | 380/44 |
| 2011/0182423 A1* | 7/2011 | Lablans | 380/30 |

OTHER PUBLICATIONS

Milos Ercegovac and Tomas Lang: "Fast Multiplication without carry-propagate Addition", Nov. 1990, IEEE Transactions on Computer, vol. 39, No. 11, pp. 1385-1390.*

J. Lopez and R. Dahab, "Fast Multiplication on Elliptic Curves over GF(2m) without Precomputation", Proceedings, Workshop on Cryptographic Hardware and Embedded Systems (CHES 1999), p. 316-327, 1999.

N. Koblitz, "Elliptic Curve Cryptosystems", Mathematics of Computation, 48, p. 203-209, 1987.

V. Miller, "Uses of Elliptic Curves in Cryptography", Proceedings, Advances in Cryptology (Crypto '85), p. 416-426, 1985.

H. Eberle, N. Gura, S. Chang-Shantz, "A Cryptographic Processor for Arbitrary Elliptic Curves over GF(2m)", Proceedings, 14th IEEE International Conference on Application-Specific Systems, Architectures and Processors (ASAP'03), 2003.

S. Chang-Shantz, "From Euclid's GCD to Montgomery Multiplication to the Great Divide", Technical Report, Sun Microsystems, SMLI TR-2001-95, Jun. 2001.

"Standards for Efficient Cryptography, SEC1: Elliptic Curve Cryptography", Technical Report, Certicom Research, Sep. 2000.

"The Digital Signature Standard (DSS)", NIST Publication FIPS Pub 186-2, Jan. 2000.

A. Weimerskirch and C. Paar, "Generalizations of the Karatsuba Algorithm for Efficient Implementations", Technical Report, University of Ruhr, Bochum, Germany, 2003.

P. Montgomery, "Five, Six and Seven-Term Karatsuba-like Formulae", IEEE Transactions on Computers, Mar. 2005.

S. S. Erdem and C. K. Koc, "A less recursive variant of Karatsuba-Ofman algorithm for multiplying operands of size of a power of two", Proceedings, 16th IEEE Symposium on Computer Arithmetic, Spain, Jun. 15-18, 2003.

J. Guajardo and C. Paar, "Efficient Algorithms for Elliptic Curve Cryptosystems", Proceedings, Advances in Cryptology (Crypto'97), p. 342-356, 1997.

P. Barrett, "Implementing the Rivest, Shamir and Adleman Public Key Encryption Algorithm on a Standard Digital Signal Processor", Master's Thesis, University of Oxford, UK, 1986.

D. Feldmeier, "Fast Software Implementation of Error Correcting Codes", IEEE Transactions on Networking, Dec. 1995.

C. Koc and T. Acar, "Montgomery Multiplication in GF(2k)", Designs, Codes and Cryptography, vol. 14, No. 1, pp. 57-69, Apr. 1998.

J. Lopez and R. Dahab, "High Speed Software Multiplication in F2m", Lecture Notes in Computer Science, vol. 1997, pp. 203-212, 2000.

C. H. Lim and P. J. Lee, "More Flexible Exponentiation with Precomputation", Advances in Cryptography (CRYPT0'94), pp. 95-107, 1997.

First Office Action mailed Dec. 14, 2010 for Chinese Patent Application No. 200810189706.

Dhem, J-F, "Efficient Modular Reduction Algorithm in IFq[x] and its Application to Left to Right Modular Multiplication in IF2[x]", Parallel & Distributed Processing & Applications: 2nd Int'l Symposium, ISPA 2004 Proceedings, Hong Kong, China, Dec. 13-15, 2004, (in: Lecture Notes in Computer Sciences, Springer, DE) vol. 2779, Jan. 1, 2003, pp. 203-213, XP112358295.

Extended European Search Report mailed Nov. 18, 2010 for European Patent Application No. 08171398.4—2212 / 2075689.

Knezevic, M. et al., "Modular Reduction in GF(2n) without Pre-Computational Phase", Parallels & Distributed Processing & Applications: 2nd Int'l Symposium, ISPA 2004 Proceedings, Hong Kong, China, Dec. 13-15, 2004, (in: Lecture Notes in Computer Sciences, Springer, DE) LNKD-DOI:10.1007/978-3-540-69499-1_7, vol. 4130, Jul. 8, 2008, pages.

Kounavis, "A New Method for Fast Integer Multiplication and its Application to Cryptography", 2007 Int'l Symposium on Performance Evaluation of Computer & Telecommunication Systems, SPECTS, Jul. 16, 2007, pp. 161-170, XP007915272.

Montgomery, P., "Five, Six, and Seven-Term Karatsuba-Like Formulae", IEEE Transaction on Computers, IEEE Service Center, Los Alamitos, CA, US LNKD-DOI: 10.1109/TC.2005.49, vol. 54, No. 3, Mar. 1, 2005, pp. 362-369, XP011125915.

Weimerskirch, A. et al., "Generalizations of the Karatsuba Algorithm for Efficient Implementations", Jan. 1, 2006, pp. 1-17, XP007915274, Retrieved from the Internet: URL: http://citeseerx.ist.psu.edu/viewdoc/summary?doi=10.1.1.61.6211, section 4.4.

First Substantive Examination Report mailed Sep. 19, 2011 for Ep Application No. 08 171 398.Apr. 2212 (Attorney Docket No. 42P26009EP),.

* cited by examiner global index notation 420 semi-local index sequence notation 410

| OPERAND SIZE | PAAR AND WEIERSKIRCH | MONTGOMERY | EMBODIMENT | SCHOOLBOOK |
|---|---|---|---|---|
| 4 | 10 | N/A | 9 | 16 |
| 5 | 15 | 13 | 14 | 25 |
| 6 | 21 | 17 | 18 | 36 |
| 7 | 28 | 22 | 25 | 49 |
| 8 | 36 | N/A | 27 | 64 |
| 9 | 45 | N/A | 36 | 81 |
| 10 | 55 | N/A | 45 | 100 |
| 18 | 171 | N/A | 108 | 324 |
| 21 | 231 | N/A | 168 | 441 |
| 36 | 666 | N/A | 324 | 1296 |

FIG. 12

METHOD FOR SPEEDING UP THE COMPUTATIONS FOR CHARACTERISTIC 2 ELLIPTIC CURVE CRYPTOGRAPHIC SYSTEMS

BACKGROUND

1. Field

The embodiments relate to the field of cryptography, and in particular to a apparatus, system, and method for speeding up the computations for characteristic 2 elliptic curve cryptographic systems.

2. Description of the Related Art

The Karatsuba algorithm (A. Karatsuba and Y. Ofman, Multiplication of Multidigit Numbers on Automata, *Soviet Physics—Doklady,* 7 (1963), pages 595-596) was proposed in 1962 as an attempt to reduce the number of scalar multiplications required for computing the product of two large numbers. The classic algorithm accepts as input two polynomials of degree equal to 1, i.e., $a(x)=a_1x+a_0$ and $b(x)=b_1x+b_0$ and computes their product $a(x)b(x)=a_1b_1x^2+(a_1b_0+a_0b_1)x+a_0b_0$ using three scalar multiplications. This technique is different from the naïve (also called the 'schoolbook') way of multiplying polynomials $a(x)$ and $b(x)$ which is to perform 4 scalar multiplications, i.e., find the products $a_0b_0$, $a_0b_1$, $a_1b_0$ and $a_1b_1$.

Karatsuba showed that you only need to do three scalar multiplications, i.e., you only need to find the products $a_1b_1$, $(a_1+a_0)(b_1+b_0)$ and $a_0b_0$. The missing coefficient $(a_1b_0+a_0b_1)$ can be computed as the difference $(a_1+a_0)(b_1+b_0)-a_0b_0-a_1b_1$ once scalar multiplications are performed. For operands of a larger size, the Karatsuba algorithm is applied recursively.

Karatsuba is not only applicable to polynomials but, also large numbers. Large numbers can be converted to polynomials by substituting any power of 2 with the variable x. One of the most important open problems associated with using Karatsuba is how to apply the algorithm to large numbers without having to lose processing time due to recursion. There are three reasons why recursion is not desirable. First, recursive Karatsuba processes interleave dependent additions with multiplications. As a result, recursive Karatsuba processes cannot take full advantage of any hardware-level parallelism supported by a processor architecture or chipset. Second, because of recursion, intermediate scalar terms produced by recursive Karatsuba need more than one processor word to be represented. Hence, a single scalar multiplication or addition requires more than one processor operation to be realized. Such overhead is significant. Third, recursive Karatsuba incurs the function call overhead.

Cetin Koc et. al. from Oregon Sate University (S. S. Erdem and C. K. Koc. "A less recursive variant of Karatsuba-Ofman algorithm for multiplying operands of size a power of two", *Proceedings, 16th IEEE Symposium on Computer Arithmetic,* J.-C. Bajard and M. Schulte, editors, pages 28-35, IEEE Computer Society Press, Santiago de Compostela, Spain, Jun. 15-18, 2003) describes a less recursive variant of Karatsuba where the size of the input operands needs to be a power of 2. This variant, however, still requires recursive invocations and only applies to operands of a particular size.

Elliptic curve cryptography, originally proposed by Koblitz (N. Koblitz, "Elliptic Curve Cryptosystems", *Mathematics of Computation,* 48, pg. 203-209, 1987) and Miller (V. Miller, "Uses of Elliptic Curvers in Cryptography", *Proceedings, Advances in Cryptology (Crypto '85,* pg. 416-426, 1985) has recently gained significant interest from the industry and key establishment and digital signature operations like RSA with similar cryptographic strength, but much smaller key sizes.

The main idea behind elliptic curve cryptography is that points in an elliptic curve form an additive group. A point can be added to itself many times where the number of additions can be a very large number. Such operation is often called 'point times scalar multiplication' or simply 'point multiplication'. The suitability of elliptic curve cryptography for public key operations comes from the fact that if the original and resulting points are known but the number of additions is unknown then it is very hard to find this number from the coordinates of the original and resulting points. The coordinates of a resulting point can form a public key whereas the number of additions resulting in the public key can form a private key.

BRIEF DESCRIPTION OF THE DRAWINGS

The embodiments are illustrated by way of example, and not by way of limitation, in the figures of the accompanying drawings and in which like reference numerals refer to similar elements and in which:

FIG. 12 illustrates comparison of prior art processes with an embodiment; and

DETAILED DESCRIPTION

Figure 1A:
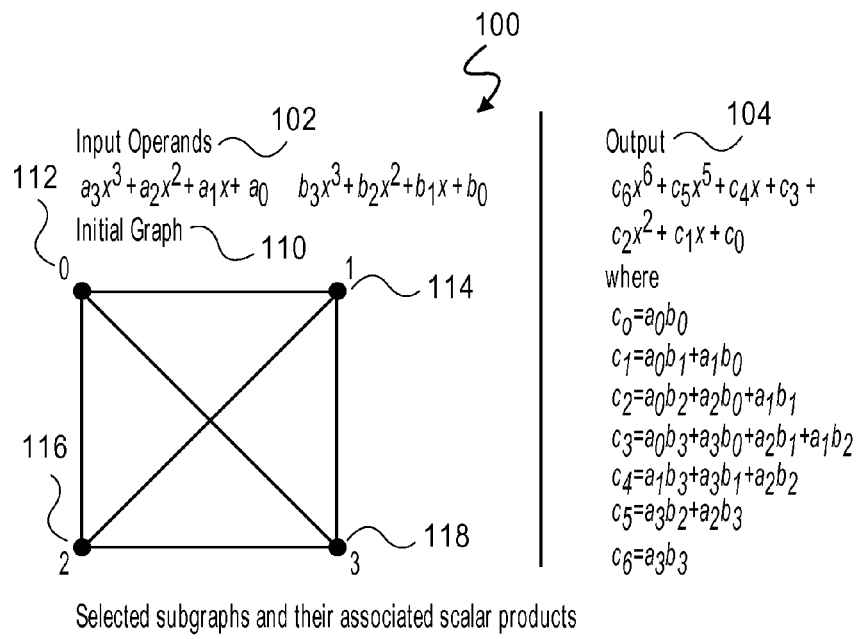
FIGS. 1A-1C illustrates flow of an embodiment of a process illustrating a 4 by 4 example.

The embodiments discussed herein generally relate to an apparatus, system and method for speeding up the computations for characteristic 2 elliptic curve cryptographic systems. In one embodiment, a projective space, such as the Lopez-Dahab space (J. Lopez and R. Dahab, "Fast Multiplication on Elliptic Curves over $GF(2^m)$ without Precomputation", *Proceedings, Workshop on Cryptographic Hardware and Embedded Systems* (CHES 1999), pg. 316-327, 1999) is used to represent point coordinates, point additions and point doublings are accelerated by introducing a novel way for multiply elements in finite fields of the form $GF(2^m)$. In one embodiment, elements are multiplied using a CPU instruction for carry-less multiplication (GFMUL) and single iteration Karatsuba-like formulae (M. Kounavis, "A New Method for Fast Integer Multiplication and its Application to Cryptography", *Proceedings, International Symposium on the Performance Evaluation of Computer and Telecommunication Systems* (SPECTS 2007), San Diego, Calif., July 2007) for computing the carry-less product of large degree polynomials in GF(2).

In one embodiment, reduction of the carry-less product of these polynomials is performed by recognizing that many curves specify fields with irreducible polynomials which are sparse. For example, National Institute of Standards and Technology (NIST) curves specify polynomials with either three terms (trinomials) or five terms (pentanomials). One embodiment speeds up Elliptic Curve Diffie Hellman based on the NIST B-233 curve by 55% in software on a 3.6 GHz Pentium 4 processor. If a 3 clock latency GFMUL instruction is introduced then the acceleration factor becomes 5.2×. Further software optimizations have the potential to increase the speedup beyond 10×. Referring to the figures, exemplary embodiments will now be described. The exemplary embodiments are provided to illustrate the embodiments and should not be construed as limiting the scope of the embodiments.

In one embodiment, point multiplication is accelerated for elliptic curves where point coordinates are elements of finite fields of the form $GF(2^m)$ and a projective space such as the Lopez-Dahab projective space (Lopez and Dahab 1999) is for representing point coordinates to ensure that all basic operations in point multiplication (i.e., point additions and point doublings) involve Galois field additions and multiplications but without division. Our implementation differs from the state-of-the-art ("The OpenSSL Source Code Distribution", available at: www.openssl.org) by the way Galois field multiplications are implemented.

In state-of-the-art implementations Galois Field (GF) multiplications are realized using 4-bit table lookups for 32 or 64-bit carry-less multiplication, recursive Karatsuba for extending the carry-less multiplication to operands of larger sizes and word-by-word reduction of the final product modulo the irreducible polynomial of the field used. In one embodiment, instruction (GFMUL) that implements the carry-less multiplication of two 64-bit inputs, is used in place of table lookups. A novel single iteration extension (Kounavis 2007) to the well known Karatsuba algorithm is applied in order to get the required carry-less multiplication of large inputs (e.g., 233 bitds), using the GFMUL instruction as a building block. In one embodiment, a method for reducing the result modulo sparse irreducible polynomials helps with improving the overall performance.

In one embodiment, the reduction for the NIST B-233 curve requires no more than 3 256-bit wide shift and 3 256-bit wide XOR operations enabling a single Intel Pentium 4 to execute Elliptic Curve Diffie Hellman 55% faster than the state-of-the-art (OpenSSL n.d.). Moreover, if a 3 clock GFMUL instruction is used then the accelerator factor becomes 5.2×. In one embodiment, reduction method eliminates the need for placing field specific-reduction logic into the implementation of a processor instructions. We first describe carry-less multiplication.

As described herein, "carry-less multiplication," also known as Galois Field (GF(2)) Multiplication is the operation of multiplying two numbers without generating or propagating carries. In the standard integer multiplication the first operand is shifted as many times as the positions of bits equal to "1" in the second operand. The product of the two operands is derived by adding the shifted versions of the first operand with each other. In the carry-less multiplication the same procedure is followed except that additions do not generate or propagate carry. In this way, bit additions are equivalent to the exclusive OR (XOR) logical operation.

Carry-less multiplication is formally defined as follows: let the two operands be A, B, of size n bits each. Let the number A be the following array of bits $$A = [a_{n-1} a_{n-2} \ldots a_0] \quad (1)$$

Let also the number B be:

$$B = [b_{n-1} b_{n-2} \ldots b_0] \quad (2)$$

Let the carry-less multiplication result be the following bit array:

$$C = [c_{2n-1} c_{2n-2} \ldots c_0] \quad (3)$$

The bits of the output C are defined as the following logic functions of the bits of the inputs A and B:

$$c_i = \bigoplus_{j=0}^{n-1} a_j b_{i-j} \quad (4)$$

for $0 \leq i \leq n-1$, and:

$$c_i = \bigoplus_{j=i-n+1}^{n-1} a_j b_{i-j} \quad (5)$$

for $n-1 \leq i \leq 2n-1$.

From the hardware implementation point of view, one can see that each of the logic functions of equations (4) and (5) can be implemented using XOR trees. The deepest XOR tree is the one implementing the function $c_{n-1}$ which takes n inputs. For example, a 64-bit instruction for Galois Field multiplication (GFMUL) requires 3969 XOR and 4096 AND gates.

In one embodiment, an XOR tree can be used for building a carry-less multiplier instruction logic of modest input operand size (e.g., 64 bits). One embodiment provides a carry-less multiplication for operands of larger sizes by expanding using a fast polynomial multiplication technique which is a generalization of the well known Karatsuba algorithm (Karatsuba and Ofman, 1963) characterized by sub-quadratic complexity as a function of the input operand size while avoiding the cost of recursion. This carry-less multiplication instruction is shown in table 1.

TABLE 1

Carry-less multiplication instruction

| Instruction | 64-bit Mode | Compat/Leg Mode | Description |
|---|---|---|---|
| CMUL r/m32 | Valid | valid | Carry-less Multiply ([EDX:EAX]←EAX * r/m32) |
| CMUL r/m64 | Valid | N.E. | Carry-less Multiply ([RDX:RAX]←RAX * r/m64) |

Description:
This instruction performs carry-less multiplication.
Input: A, B (n bits)
Output: C (2n bits)
C [i] = XOR (j = 0 . . . i, A [j] & B [i − j]) for i = 0 . . . n − 1
C [i] = XOR (j = i + 1 − n . . . n − 1, A [j] & B [i − j]) for i = n . . . 2n − 1
C [2n] = 0
Example: For n = 2, A = [A [1], A [0]], B = [B [1], B [0]], C[0] = A [0] & B [0], C [1] = A [0]&B[1] XOR A [1]&B[0], C [2] = A [1] & B [1], C [3] = 0
Operation:
[EDX:EAX]←EAX * r/m32
[RDX:RAX]←RAX * r/m64

Figure 1B:
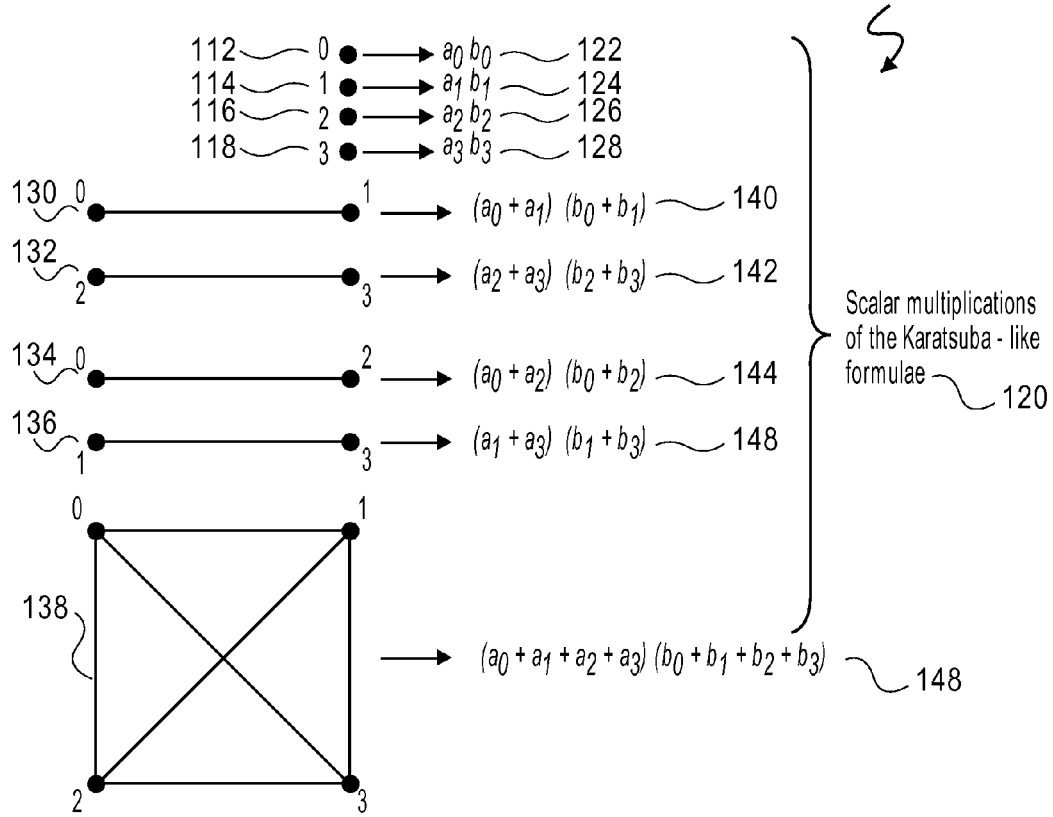
Figure 1C:
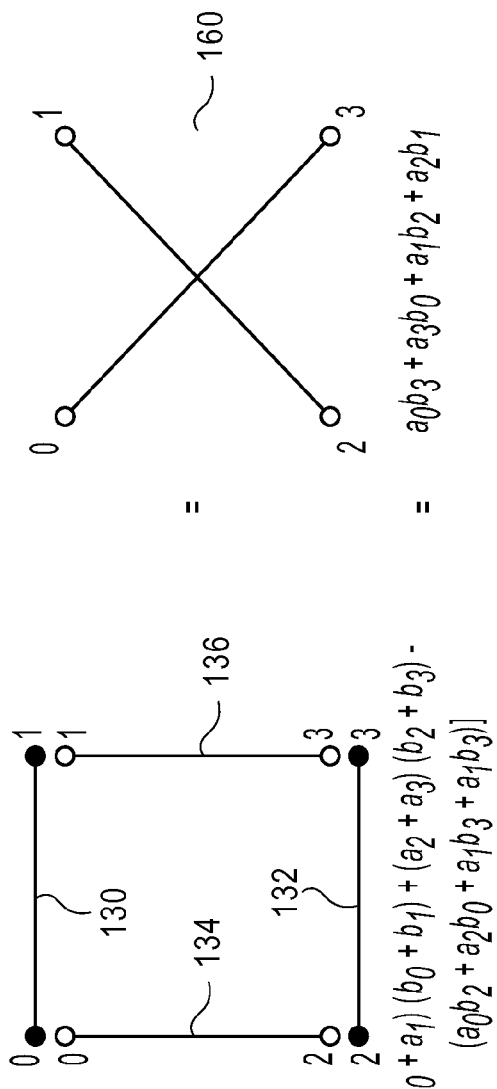

We now describe a single iteration graph-based multiplication routine. FIGS. 1A-1C illustrate an example of generating the terms of a 4 by 4 product using graphs to provide a multiplication routine 100 according to an embodiment. As illustrated in 1A the input operands 102 are of size 4 words. In other embodiments, the operand size is the native operand size of a machine, such as a computing device (e.g., a computer). The operands 102 are the polynomials $a(x)=a_3x^3+a_2x^2+a_1x+a_0$ and $b(x)=b_3x^3+b_2x^2+b_1x+b_0$. Because of the fact that the input operand size is 4 the embodiment builds a complete square 110. The vertices (112, 114, 116, 118) of the square 110 are indexed 0, 1, 2, and 3 as illustrated in FIG. 1A. The complete square is constructed in a first part of a process of an embodiment (see FIG. 11A). In a second part of a process of an embodiment, a set of complete sub-graphs are selected and each sub-graph is mapped to a scalar product (see FIG. 11B).

A complete sub-graph connecting vertices $i_0, i_2, \ldots, i_{m-1}$ is mapped to the scalar product $(a_{i_0}+a_{i_1}+ \ldots +a_{i_{m-1}}) \cdot (b_{i_0}+b_{i_1}+ \ldots +b_{i_{m-1}})$. The complete sub-graphs 110 selected in the example illustrated in FIG. 1B are the vertices 0 (112), 1 (114), 2(116) and 3 (118), the edges 0-1 (130), 2-3 (132), 0-2 (134) and 1-3 (136), and the entire square 0-1-2-3 (138). The scalar products defined in the second part of the process are $a_0b_0$ (122), $a_1b_1$(124), $a_2b_2$ (126), $a_3b_3$ (128), $(a_0+a_1)(b_0+b_1)$ 140, $(a_2+a_3)(b_2+b_3)$ 142, $(a_0+a_2)(b_0+b_2)$ 144, $(a_1+a_3)(b_1+b_3)$ 146, and $(a_0+a_1+a_2+a_3)(b_1+b_1+b_2+b_3)$ 148. In the last part of the process a number of subtractions are performed (see FIG. 1C and FIG. 11B, 1165).

FIG. 1C illustrates an example of subtraction process 150 where the edges 0-1 and 2-3 (130 and 132 with their adjacent vertices), and 0-2 and 1-3 (134 and 136 without their adjacent vertices) are subtracted from the complete square 0-1-2-3 138. What remains is the diagonals 0-3 and 1-2 160. These diagonals 160 correspond to the term $a_1b_2+a_2b_1+a_3b_0+a_0b_3$, which is the coefficient of $x^3$ of the result. In one embodiment the differences produced by the subtractions of sets of formulae (110, 120, 150) represent diagonals of complete graphs where the number of vertices in these graphs is a power of 2 (i.e., squares, cubes, hyper-cubes, etc.). The terms that result from the subtractions, if added to one another, create the coefficients of the final product 104.

To explain in more detail, the following definitions are first noted. N represents the size of the input (i.e., the number of terms in each input polynomial). N is the product of L integers $n_0, n_1, \ldots, n_{L-1}$. The number L represents the number of levels of multiplication.

$$N = n_0 \cdot n_1 \cdot \ldots \cdot n_{L-1} \quad (6)$$

For L levels, where a 'level' defines a set of complete graphs, the set of graphs of level l is represented as $G^{(l)}$. The cardinality of the set $G^{(l)}$ is represented as $|G^{(l)}|$. The i-th element of the set $G^{(l)}$ is represented as $G_i^{(l)}$. Each set of graphs $G^{(l)}$ has a finite number of elements. The cardinality of the set $G^{(l)}$ is defined as:

$$|G^{(l)}| = \begin{cases} \prod_{i=0}^{l-1} n_i, & l > 0 \\ 1, & l = 0 \end{cases} \quad (7)$$

Each element of the set $G^{(l)}$ is isomorphic to a complete graph $K_{n_l}$. The formal definition of the set of graphs $G^{(l)}$ is illustrated in equation (8):

$$G^{(l)} = \{G_i^{(l)} : i \in [0, |G^{(l)}|-1], G_i^{(l)} \cong K_{n_l}\} \quad (8)$$

Figure 2:
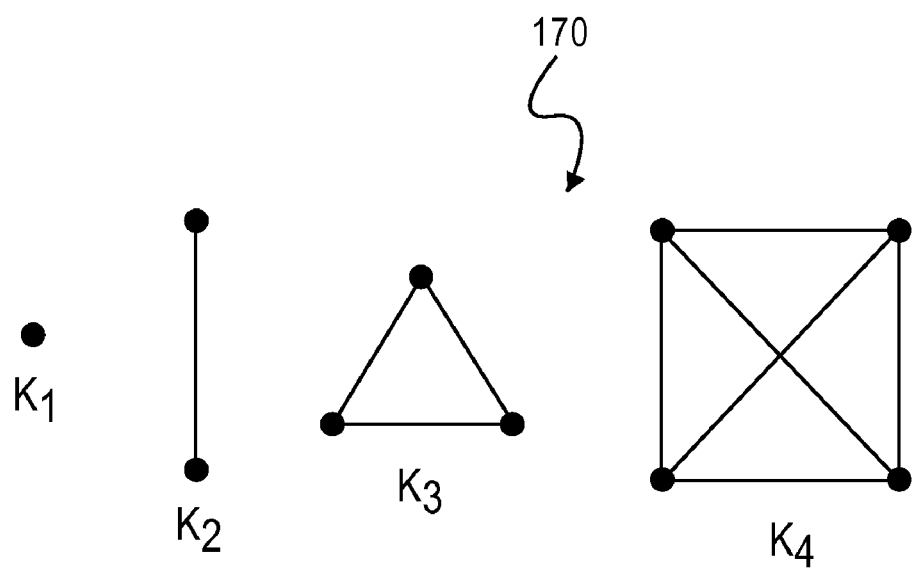
FIG. 2 illustrates examples of complete graphs.
Figure 3:
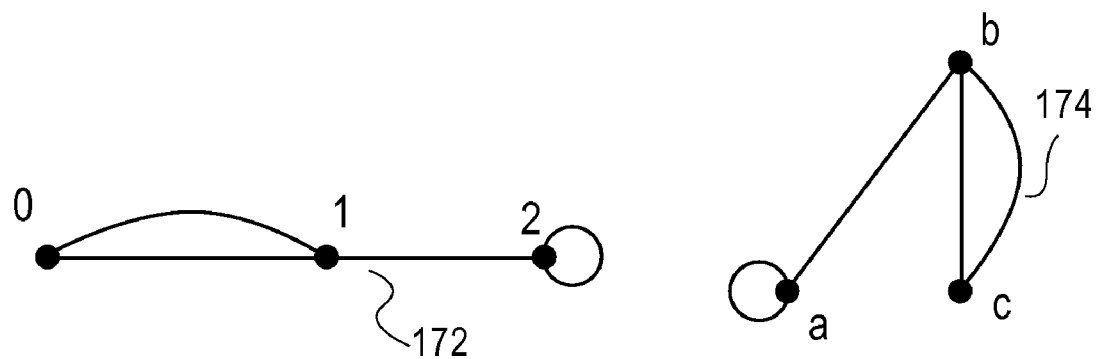
FIG. 3 illustrates examples of graph isomorphism.

A complete graph $K_a$ is a graph consisting of a vertices indexed $0, 1, 2, \ldots, a-1$, where each vertex is connected with each other vertex of the graph with an edge. FIG. 2 illustrates examples of complete graphs 170. Two graphs A and B are called isomorphic if there exists a vertex mapping function $f_v$ and an edge mapping function $f_e$ such that for every edge e of A the function $f_v$ maps the endpoints of e to the endpoints of $f_e(e)$. Both the edge $f_e(e)$ and it endpoints belong to graph B. FIG. 3 illustrates an example of two isomorphic graphs.

In one embodiment an element of the set $G^{(l)}$ can be indexed in two ways. One way is by using a unique index i which can take all possible values between 0 and $|G^{(l)}|-1$, where the cardinality $|G^{(l)}|$ is given by equation (7). Such an element is represented as $G_i^{(l)}$. This way of representing graphs is denoted as a 'global index'. That is, the index used for representing a graph at a particular level is called global index.

Another way to index the element $G_i^{(l)}$ is by using a set of l indexes $i_0, i_1, \ldots, i_{l-1}$, with $l>0$. This type of index sequence is denoted as a 'local index' sequence. In the trivial case where $l=0$, the local index sequence consists of one index only, which is equal to zero. The local indexes $i_0, i_1, \ldots, i_{l-1}$ are related with the global index i of a particular element $G_i^{(l)}$ in a manner illustrated in equation (9).

$$i = (((i_0 \cdot n_1) + i_1) \cdot n_2 + i_2) \cdot n_3 + \ldots + i_{l-1} \quad (9)$$

Equation (9) can also be written in closed form as:

$$i = i_0 \cdot n_1 \cdot n_2 \cdot \ldots \cdot n_{l-1} + i_1 \cdot n_2 \cdot \ldots \cdot n_{l-1} + \ldots + \quad (10)$$

$$i_{l-2} \cdot n_{l-1} + i_{l-1}$$

$$= \sum_{j=0}^{l-1} \left( i_j \cdot \prod_{k=j+1}^{l-1} n_k \right)$$

The local indexes $i_0, i_1, \ldots, i_{l-1}$ satisfy the following inequalities:

$$0 \leq i_0 \leq n_0 - 1$$

$$0 \leq i_1 \leq n_1 - 1$$

$$\ldots 0 \leq i_{l-1} \leq n_{l-1} - 1 \quad (11)$$

In one embodiment the value of a global index i related to a local index sequence $i_0, i_1, \ldots, i_{l-1}$ is between 0 and $|G^{(l)}|-1$ if inequalities (6) hold and the cardinality $|G^{(l)}|$ is given by (2). This is proved by the following: from equation (9) it can be seen that i is a non-decreasing function of $i_0, i_1, \ldots, i_{l-1}$. Therefore, the smallest value of i is produced by setting each local index equal to zero. Therefore, the smallest i is zero. The highest value of i is obtained by setting each local index $i_0, i_1, \ldots, i_{l-1}$ to be equal to its maximum value. Substituting each local index $i_j$ with $n_j-1$ for $0 \leq j \leq l-1$ results in:

$$i_{max} = (n_0 - 1) \cdot n_1 \cdot n_2 \cdot \ldots \cdot n_{l-1} + (n_1 - 1) \cdot \quad (12)$$

$$n_2 \cdot \ldots \cdot n_{l-1} + \ldots + n_{l-1} - 1$$

$$= n_0 \cdot n_1 \cdot n_2 \cdot \ldots \cdot n_{l-1} - n_1 \cdot n_2 \cdot n_3 \cdot \ldots \cdot n_{l-1} +$$

$$n_1 \cdot n_2 \cdot n_3 \cdot \ldots \cdot n_{l-1} - n_2 \cdot n_3 \cdot n_4 \cdot \ldots \cdot n_{l-1} +$$

$$n_2 \cdot n_3 \cdot n_4 \cdot \ldots \cdot n_{l-1} - n_3 \cdot n_4 \cdot n_5 \cdot \ldots \cdot n_{l-1} + \ldots - n_{l-1} +$$

$$n_{l-1} - 1$$

$$= n_0 \cdot n_1 \cdot n_2 \cdot \ldots \cdot n_{l-1} - 1$$

$$= |G^{(l)}| - 1$$

In one embodiment for each global index i between 0 and $|G^{(l)}|-1$ there exists a unique sequence of local indexes $i_0$, $i_1, \ldots, i_{l-1}$ satisfying equation (10) and the inequalities in equation (11). This is proved by the following: to prove that for a global index i such that $0 \leq i \leq |G^{(l)}|-1$ there exists at least one sequence of local indexes $i_0, i_1, \ldots, i_{l-1}$ satisfying equation (10) and equation (11), in one embodiment, the following pseudo code represents the construction of such a sequence of local indexes:

```
LOCAL_INDEXES(i)
1.   for j ← 0 to l-1
2.     do if j+1 ≤ l-1
3.       then
```

4.
$$i_j \leftarrow i \text{ div} \prod_{k=j+1}^{l-1} n_k$$

5.
$$i \leftarrow i \bmod \prod_{k=j+1}^{l-1} n_k$$

```
6.     else
7.       i_j ← i mod n_{l-1}
8.   return {i_0, i_1, ..., i_{l-1}}
```

It can be seen that the local index sequence $i_0, i_1, \ldots, i_{l-1}$ produced by the LOCAL_INDEXES satisfies both equation (10) and the inequalities in equation (11). Therefore, the existence of a local index sequence associated with a global index is proven.

To prove the uniqueness of the local index sequence, it is noted that if two sequences $i_0, i_1, \ldots, i_{l-1}$ and $i'_0, i'_1, \ldots, i'_{l-1}$ satisfy equation (10) and equation (11), then it is not possible for some index q, $0 \leq q \leq l-1$, to have $i'_q \neq i_q$. Assume the opposite, i.e., that there are m indexes $q_0, q_1, \ldots, q_{m-1}$ such that $i'_{q_0} \neq i_{q_0}, i'_{q_1} \neq i_{q_1}, \ldots, i'_{q_{m-1}} \neq i_{q_{m-1}}$. Also assume that that for all other indexes the sequences $i_0, i_1, \ldots, i_{l-1}$ and $i'_0, i'_1, \ldots, i'_{l-1}$ are identical. Since both sequences satisfy equation (10) the following identity is true:

$$(i_{q_0} - i'_{q_0}) \cdot n_{q_0+1} \cdot \ldots \cdot n_{l-1} + (i_{q_1} - i'_{q_1}) \cdot n_{q_1+1} \cdot \ldots \cdot n_{l-1} + \ldots + (i_{q_{m-1}} - i'_{q_{m-1}}) \cdot n_{q_{m-1}+1} \cdot \ldots \cdot n_{l-1} = 0 \quad (13)$$

Without loss of generality, assume that $q_0 < q_1 < \ldots < q_{m-1}$. The number $(i_{q_0} - i'_{q_0}) \cdot n_{q_0+1} \cdot \ldots \cdot n_{l-1}$ is clearly a multiple of $n_{q_0+1} \cdot \ldots \cdot n_{l-1}$. The addition of the term $(i_{q_1} - i'_{q_1}) \cdot n_{q_1+1} \cdot \ldots \cdot n_{l-1}$ to this number is not possible to make the sum $(i_{q_0} - i'_{q_0}) \cdot n_{q_0+1} \cdot \ldots \cdot n_{l-1} + (i_{q_1} - i'_{q_1}) \cdot n_{q_1+1} \cdot \ldots \cdot n_{l-1}$ equal to zero since $|i_{q_1} - i'_{q_1}| \leq n_{q_1} - 1 < n_{q_1} \leq n_{q_0+1} \cdot \ldots \cdot n_{q_1}$. The same can be said about the addition of all other terms up to $(i_{q_{m-1}} - i'_{q_{m-1}}) \cdot n_{q_{m-1}+1} \cdot \ldots \cdot n_{l-1}$. As a result, it is not possible for equation (13) to hold. Therefore, the uniqueness of the local index sequence is proven.

The following notation is used to represent a graph associated with global index i and local index sequence $i_0, i_1, \ldots, i_{l-1}$ $$G_i^{(l)} = G_{(i_0)(i_1)\ldots(i_{l-1})}^{(l)} \quad (14)$$

Consider the graph $G_i^{(l)}$ (or $G_{(i_0)(i_1)\ldots(i_{l-1})}^{(l)}$) of level l. This graph is by definition isomorphic to $K_{n_l}$. This means that this graph consists of $n_l$ vertices and $n_l \cdot (n_l-1)/2$ edges, where each vertex is connected to every other vertex with an edge. The set $V_i^{(l)}$ (or $V_{(i_0)(i_1)\ldots(i_{l-1})}^{(l)}$) is defined as the set of all vertices of the graph $G_i^{(l)}$ (or $G_{(i_0)(i_1)\ldots(i_{l-1})}^{(l)}$). In one embodiment three alternative ways are used to represent the vertices of a graph. One way is using the local index sequence notation. The $i_l$-th vertex of a graph $G_{(i_0)(i_1)\ldots(i_{l-1})}^{(l)}$ is represented as $v_{(i_0)(i_1)\ldots(i_{l-1})(i_l)}^{(l)}$, where $0 \leq i_l \leq n_l - 1$. Using the local index sequence notation, the set of all vertices of a graph $G_{(i_0)(i_1)\ldots(i_{l-1})}^{(l)}$ is defined as:

$$V_{(i_0)(i_1)\ldots(i_{l-1})}^{(l)} = \{v_{(i_0)(i_1)\ldots(i_{l-1})(i_l)}^{(l)} : 0 \leq i_l \leq n_l - 1\} \quad (15)$$

A second way to represent the vertices of a graph is using a 'semi-local' index sequence notation. In one embodiment a semi-local index sequence consists of a global index of a graph and a local index associated with a vertex. Using the semi-local index sequence notation, the $i_l$-th vertex of a graph $G_i^{(l)}$ is represented as $v_{i,i_l}^{(l)}$, where $0 \leq i_l \leq n_l - 1$. In this way, the set of all vertices of a graph $G_i^{(l)}$ is defined as:

$$V_i^{(l)} = \{v_{i,i_l}^{(l)} : 0 \leq i_l \leq n_l - 1\} \quad (16)$$

In one embodiment, for each vertex $v_{i,i_l}^{(l)}$ a unique global index $i_g \leftarrow i \cdot n_l + i_l$ is assigned. It is shown that $0 \leq i_g \leq |G^{(l+1)}| - 1$ and for every semi-local index sequence i, $i_l$ there exists a unique global index $i_g$ such that $i_g = i \cdot n_l + i_l$; also for every global index $i_g$ there exists a unique semi-local index sequence i, $i_l$ such that $i_g = i \cdot n_l + i_l$.

Substituting i with $$\sum_{j=0}^{l-1} \left( i_j \cdot \prod_{k=j+1}^{l-1} n_k \right)$$

according to equation (10), the global index $i_g$ of a vertex is associated with a local index sequence $i_0, i_1, \ldots, i_{l-1}, i_l$. The indexes $i_0, i_1, \ldots, i_{l-1}$ characterize the graph that contains the vertex whereas the index $i_l$ characterizes the vertex itself. The relationship between $i_g$ and $i_0, i_1, \ldots i_{l-1}, i_l$ is given in equation (17):

$$i_g = \sum_{j=0}^{l} \left( i_j \cdot \prod_{k=j+1}^{l} n_k \right) \quad (17)$$

In one embodiment a global index $i_g$ associated with some vertex of a graph at level l has an one-to-one correspondence to a unique sequence of local indexes $i_0, i_1, \ldots, i_{l-1}, i_l$ satisfying identity (12), the inequalities (6) and $0 \leq i_l \leq n_l - 1$.

Using the global index notation, the set of all vertices of a graph $G_i^{(l)}$ (or $G_{(i_0)(i_1)\ldots(i_{l-1})}^{(l)}$) is defined as:

$$V_i^{(l)} = \{v_{i_g}^{(l)} : i_g = i \cdot n_l + i_l, 0 \leq i_l \leq n_l - 1\} \quad (18)$$

or $$V_{(i_0)(i_1)\ldots(i_{l-1})}^{(l)} = \left\{ v_{i_g}^{(l)} : i_g = \sum_{j=0}^{l} \left( i_j \cdot \prod_{k=j+1}^{l} n_k \right), 0 \leq i_l \leq n_l - 1 \right\} \quad (19)$$

The edge which connects two vertices $v_j^{(l)}$ and $v_k^{(l)}$ of a graph at level l is represented as $e_{j-k}^{(l)}$. If two vertices $v_{i,i_l}^{(l)}$ and $v'_{i,i_l}^{(l)}$ are represented using the semi-local index sequence notation, the edge which connects these two vertices is represented as $e_{i,i_l-i,i'_l}^{(l)}$. Finally, if two vertices $v_{(i_0)(i_1)\ldots(i_{l-1})(i_l)}^{(l)}$ and $v_{(i_0)(i_1)\ldots(i_{l-1})(i'_l)}^{(l)}$ are represented using the local index sequence notation, the edge which connects these two vertices is represented as $e_{(i_0)(i_1)\ldots(i_{l-1})(i_l)-(i_0)(i_1)\ldots(i_{l-1})(i'_l)}^{(l)}$. The set of all edges of a graph $G_i^{(l)}$ (or $G_{(i_0)(i_1)\ldots(i_{l-1})}^{(l)}$) is represented as $E_i^{(l)}$ (or $E_{(i_0)(i_1)\ldots(i_{l-1})}^{(l)}$). This set is formally defined as:

$$E_{(i_0)(i_1)\ldots(i_{l-1})}^{(l)} = \{e_{(i_0)(i_1)\ldots(i_{l-1})(i_l)-(i_0)(i_1)\ldots(i_{l-1})(i'_l)}^{(l)}: 0 \leq i_l \leq n_l-1, 0 \leq i'_l \leq n_l-1, i_l \neq i'_l\} \quad (20)$$

or $$E_i^{(l)} = \{e_{i,i_l-i,i'_l}^{(l)}: 0 \leq i_l \leq n_l-1, 0 \leq i'_l \leq n_l-1, i_l \neq i'_l\} \quad (21)$$

or $$E_i^{(l)} = \{e_{i_g-i'_g}^{(l)}: i_g = i \cdot n_l + i_l, i'_g = i \cdot n_l + i'_l, 0 \leq i_l \leq n_l-1, 0 \leq i'_l \leq n_l-1, i_l \neq i'_l\} \quad (22)$$

In one embodiment, the notation used for edges between vertices of different graphs of the same level is the same as the notation used for edges between vertices of the same graph. For example, an edge connecting two vertices $v_{(i_0)(i_1)\ldots(i_{l-1})(i_l)}^{(l)}$ and $v_{(i'_0)(i'_1)\ldots(i'_{l-1})(i'_l)}^{(l)}$ which are represented using the local index sequence notation is denoted as $e_{(i_0)(i_1)\ldots(i_{l-1})(i_l)-(i'_0)(i'_1)\ldots(i'_{l-1})(i'_l)}^{(l)}$.

In one embodiment alternative notations for the sets of vertices and edges of a graph G are V(G) and E(G) respectively. In addition, the term 'simple' from graph theory is used to refer to graphs, vertices and edges associated with the last level L−1. The graphs, vertices and edges of all other levels l, l<L−1 are referred to as 'generalized'. The level associated with a particular graph G, vertex v or edge e is denoted as l(G), l(v) or l(e) respectively.

A vertex to graph mapping function $f^{v \to g}$ is defined as a function that accepts as input a vertex of a graph at a particular level l, l<L−1 and returns a graph at a next level l+1 that is associated with the same global index or local index sequence as the input vertex.

$$f^{v \to g}(v_{i,i_l}^{(l)}) = G_{n_l i + i_l}^{(l+1)} \quad (23)$$

Alternative definitions of the function $f^{v \to g}$ are:

$$f^{v \to g}(v_i^{(l)}) = G_i^{(l+1)} \quad (24)$$

and $$f^{v \to g}(v_{(i_0)(i_1)\ldots(i_{l-1})(i_l)}^{(l)}) = G_{(i_0)(i_1)\ldots(i_{l-1})(i_l)}^{(l+1)} \quad (25)$$

Similarly, a graph to vertex mapping function $f^{g \to v}$ is defined as a function that accepts as input a graph at a particular level l, l>0 and returns a vertex at a previous level l−1 that is associated with the same global index or local index sequence as the input graph.

$$f^{g \to v}(G_i^{(l)}) = v_{[i/n_{l-1}], i \bmod n_{l-1}}^{(l-1)} \quad (26)$$

Alternative definitions of the function $f^{g \to v}$ are:

$$f^{g \to v}(G_i^{(l)}) = v_i^{(l-1)} \quad (27)$$

and $$f^{g \to v}(G_{(i_0)(i_1)\ldots(i_{l-1})}^{(l)}) = v_{(i_0)(i_1)\ldots(i_{l-1})}^{(l-1)} \quad (28)$$

The significance of the vertex to graph and graph to vertex mapping functions lies on the fact that they allow us to represent pictorially all graphs of all levels defined for a particular operand input size. First, each vertex of a graph is represented as a circle. Second, inside each circle, a graph is drawn at the next level, which maps to the vertex represented by the circle. As an example, FIG. 4 illustrates how the graphs 200 are drawn and defined for an 18 by 18 multiplication.

Figure 4:
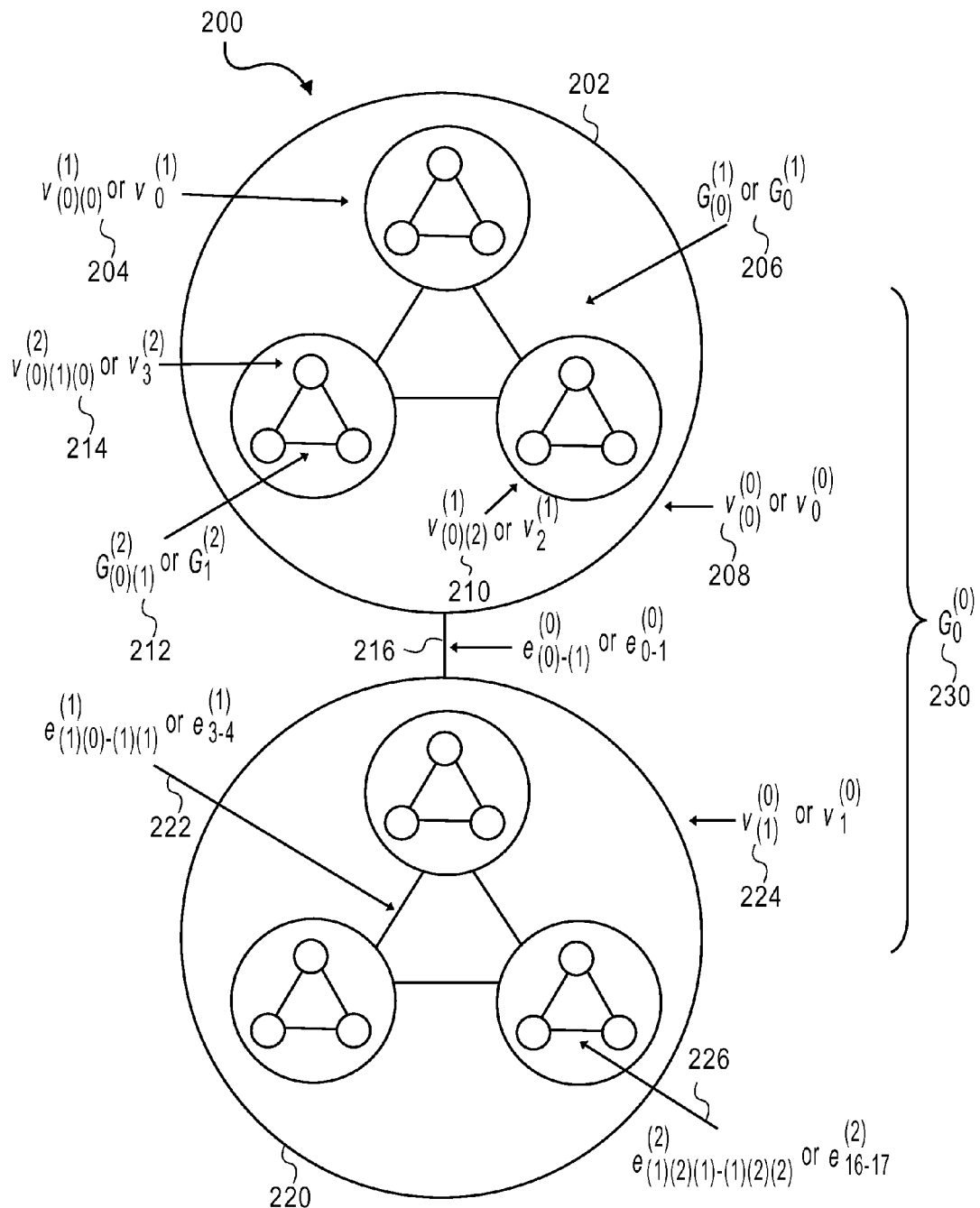
FIG. 4 illustrates graph representations of an embodiment for an 18 by 18 example.

In the example illustrated in FIG. 4, N=18. N can be written as the product of three factors, i.e., 2, 3 and 3. Setting the number of levels L to be equal to 3 and $n_0=2$, $n_1=n_2=3$, the graphs are drawn for all levels associated with the multiplication as shown in FIG. 4. It can be seen that the vertices of the graphs at the last level do not contain any other graphs. This is the reason they are called 'simple'. It can also be seen that each vertex at a particular level contains as many sets of graphs as the number of levels below. This is the reason why sets of graphs are referred to as 'levels'.

In one embodiment the term 'spanning' is overloaded from graph theory. The term spanning is used to refer to edges or collections of edges that connect vertices of different graphs at a particular level.

A spanning plane is defined as a graph resulting from the join '+' operation between two sub-graphs of two different graphs of the same level. Each of the two sub-graphs consists of a single edge connecting two vertices. Such two sub-graphs are described below:

$$\{\{v_{(i_0)(i_1)\ldots(i_{l-1})(i_l)}^{(l)}, v_{(i_0)(i_1)\ldots(i_{l-1})(\hat{i}_l)}^{(l)}\}, e_{(i_0)(i_1)\ldots(i_{l-1})(i_l)-(i_0)(i_1)\ldots(i_{l-1})(\hat{i}_l)}^{(l)}\}, \text{ and}$$

$$\{\{v_{(i'_0)(i'_1)\ldots(i'_{l-1})(i'_l)}^{(l)}, v_{(i'_0)(i'_1)\ldots(i'_{l-1})(\hat{i}'_l)}^{(l)}\}, e_{(i'_0)(i'_1)\ldots(i'_{l-1})(i'_l)-(i'_0)(i'_1)\ldots(i'_{l-1})(\hat{i}'_l)}^{(l)}\} \quad (29)$$

In addition, the local index sequences characterizing the two edges which are joined for producing a spanning plane need to satisfy the following conditions:

$$i_0 = i'_0, i_1 = i'_1, \ldots, i_q \neq i'_q, \ldots, i_l = i'_l, \hat{i}_l = \hat{i}'_l \quad (30)$$

Equation (30) can be also written in closed form as follows:

$$(\exists q, q \in [0, l-1]: i_q \neq i'_q) \wedge (\forall j \in [0, l], j \neq q: i_j = i'_j) \wedge (\hat{i}_l = \hat{i}'_l) \quad (31)$$

Equation (30) or equation (31) indicate that all corresponding local indexes of the joined edges in a spanning plane are identical apart from the indexes in a position q, where $0 \leq q \leq l-1$. Since $i_q \neq i'_q$, this means that the two edges that are joined to form a spanning plane are associated with different graphs. In the special case where q=l−1, the two graphs containing the joined edges of a spanning plane map to vertices of the same graph at level l−1, since $i_0=i'_0, i_1=i'_1, \ldots, i_{l-2}=i'_{l-2}$.

Figure 5:
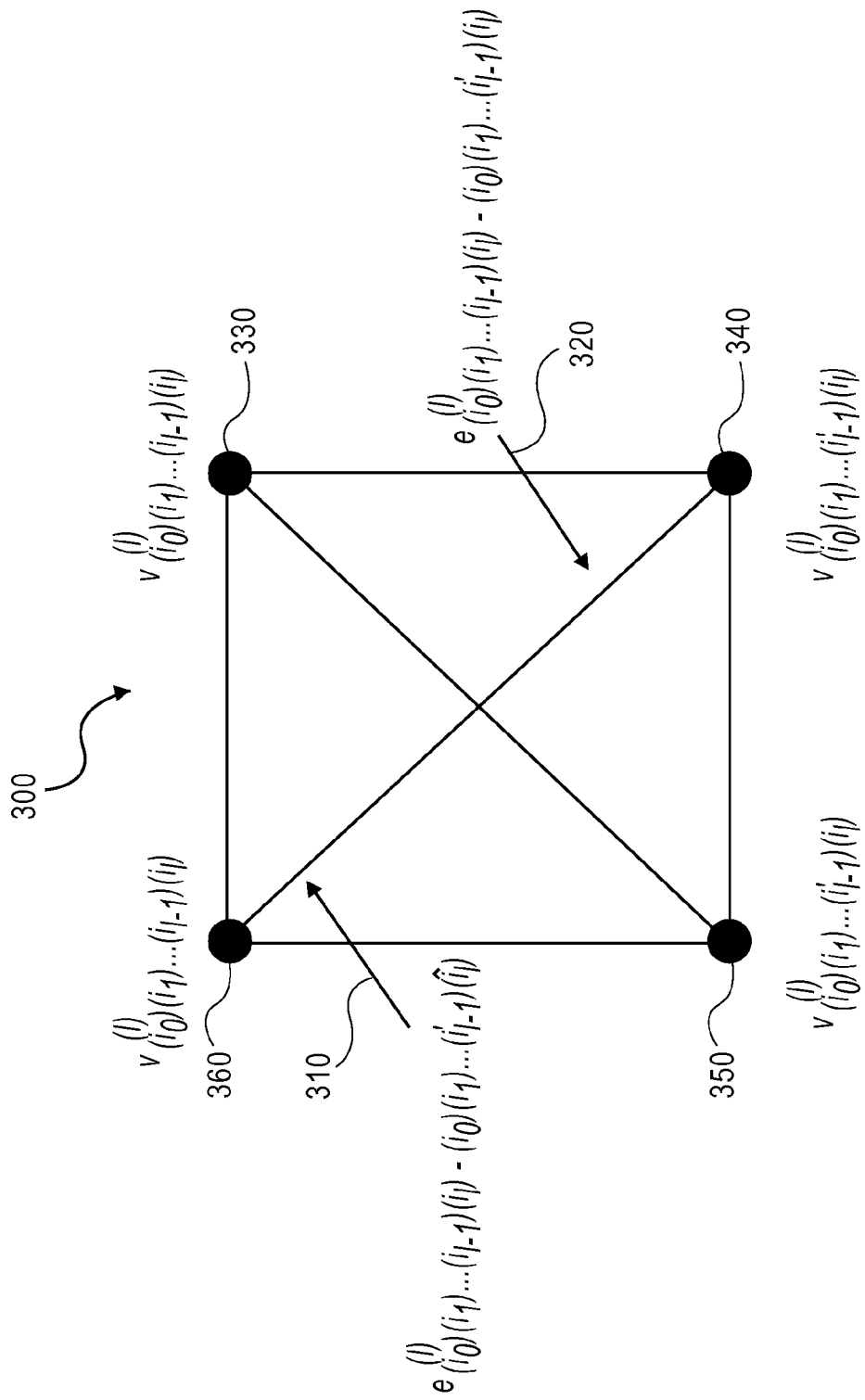
FIG. 5 illustrates a representation of a spanning plane of an embodiment using a local index sequence notation.

The join operation '+' between two graphs is defined as a new graph consisting of the two operands of '+' plus new edges connecting every vertex of the first operand to every vertex of the second operand. A spanning plane 300 produced by joining the two sub-graphs of equation (29) with equation (31) holding and q=l−1 is illustrated in FIG. 5. As illustrated in FIG. 5, vertices and edges are represented using the local index sequence notation.

Using the local index sequence notation, a spanning plane can be formally defined as:

$$s_{(i_0)(i_1)\ldots(i_q-i'_q)\ldots(i_{l-1})(i_l-\hat{i}_l)}^{p(l)} = \\ \{\{v_{(i_0)\ldots(i_q)\ldots(i_{l-1})(i_l)}^{(l)}, v_{(i_0)\ldots(i_q)\ldots(i_{l-1})(\hat{i}_l)}^{(l)}\}, e_{(i_0)\ldots(i_q)\ldots(i_{l-1})(i_l)-(i_0)\ldots(i_q)\ldots(i_{l-1})(\hat{i}_l)}^{(l)}\} + \\ \{\{v_{(i_0)\ldots(i'_q)\ldots(i_{l-1})(i_l)}^{(l)}, v_{(i_0)\ldots(i'_q)\ldots(i_{l-1})(\hat{i}_l)}^{(l)}\}, e_{(i_0)\ldots(i'_q)\ldots(i_{l-1})(i_l)-(i_0)\ldots(i'_q)\ldots(i_{l-1})(\hat{i}_l)}^{(l)}\} \quad (32)$$

Since the local index sequence notation is lengthy, the shorter 'semi-local' index sequence notation is used for representing a spanning plane:

$$s_{i,i_l-i,i'_l,i_l-\hat{i}_l}^{p(l)} = \{\{v_{i,i_l}^{(l)}, v_{i,\hat{i}_l}^{(l)}\}, e_{i,i_l-i,\hat{i}_l}^{(l)}\} + \\ \{\{v_{i',i_l}^{(l)}, v_{i',\hat{i}_l}^{(l)}\}, e_{i',i_l-i',\hat{i}_l}^{(l)}\} \quad (33)$$

In the definition of equation (33) above, the value of the index i is given by identity equation (10) and:

$$i' = i_0 n_1 n_2 \cdot \ldots \cdot n_{l-1} + i_1 n_2 \cdot \ldots \cdot n_{l-1} + \ldots + i'_q n_{q+1} \cdot \ldots \cdot n_{l-1} + \ldots + i_{l-2} n_{l-1} + i_{l-1} \quad (34)$$

In one embodiment global index notation is used for representing a spanning plane. Using the global index notation, a spanning plane is defined as:

$$s_{i_g-\hat{i}_g,i'_g-\hat{i}'_g}^{p(l)} = \{\{v_{i_g}^{(l)}, v_{\hat{i}_g}^{(l)}\}, e_{i_g-\hat{i}_g}^{(l)}\} + \\ \{\{v_{i'_g}^{(l)}, v_{\hat{i}'_g}^{(l)}\}, e_{i'_g-\hat{i}'_g}^{(l)}\} \quad (35)$$

In the equation (35) notation above:

$$i_g = i \cdot n_l + i_l, \quad \hat{i}_g = i \cdot n_l + \hat{i}_l, \quad i'_g = i' \cdot n_l + i_l, \quad \hat{i}'_g = i' \cdot n_l + \hat{i}_l \qquad (36)$$

Figure 6B:
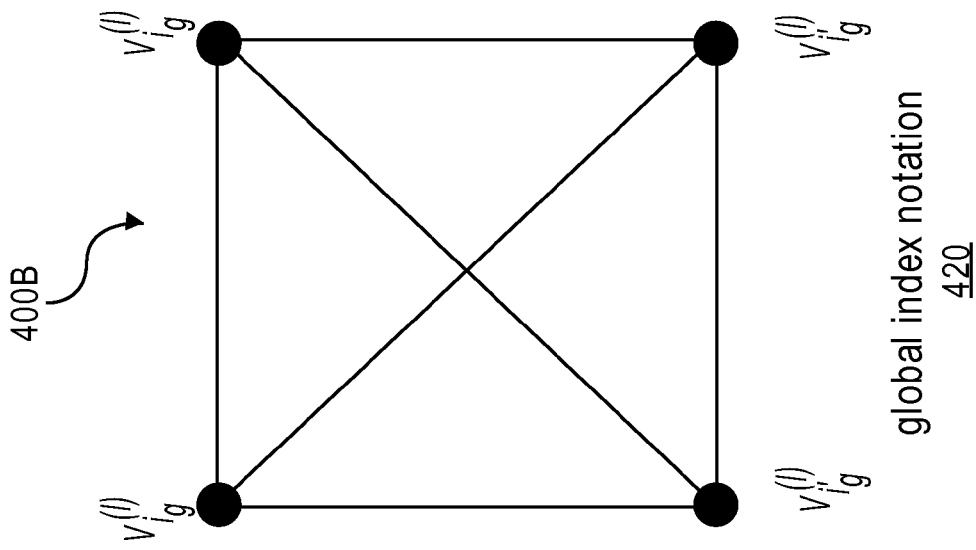
FIGS. 6A and 6B illustrate a representation of spanning planes of an embodiment using a semi-local index sequence and global index notations.
Figure 6A:
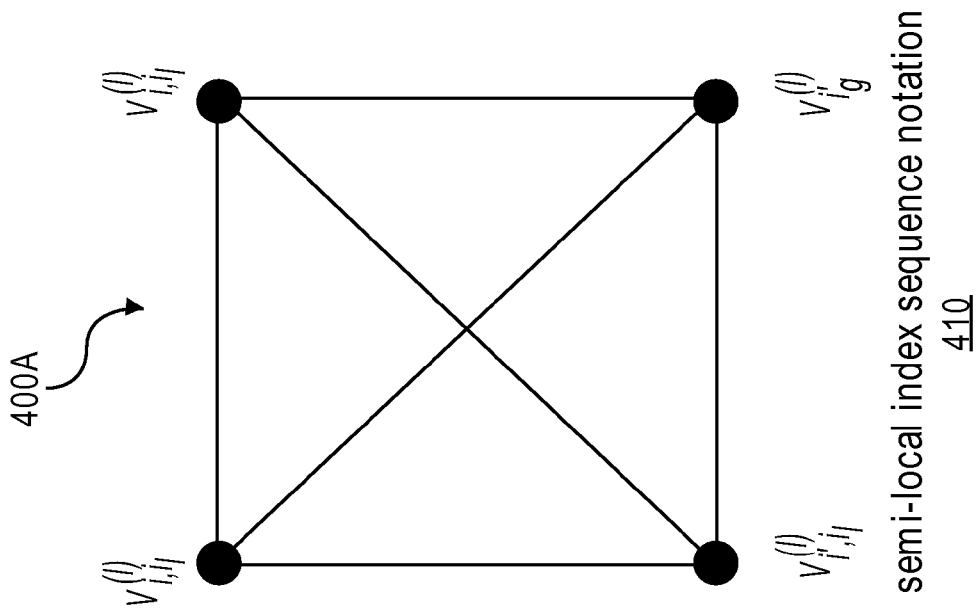

The index i in identity (31) is given by identity (5) whereas the index i' in (31) is given by identity (29). A pictorial representation of spanning planes 400 (400A, 400B) using the semi-local index sequence 410 and global index notations 420 is given in FIGS. 6A and 6B.

Figure 7:
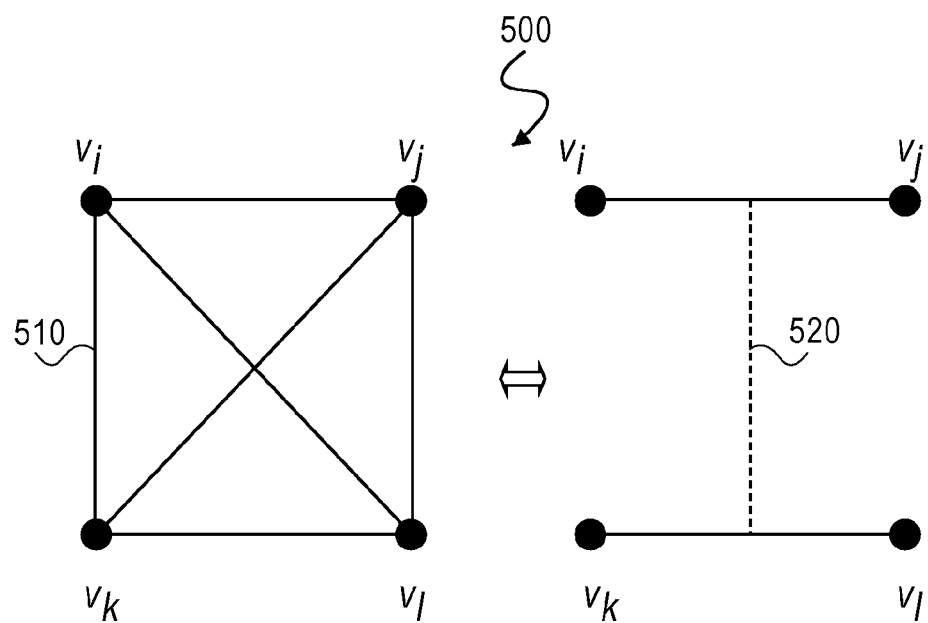
FIG. 7 illustrates an alternative representation of a spanning plane.

In another embodiment, an alternative pictorial representation of a spanning plane 500 used as illustrated in FIG. 7. The vertices shown in FIG. 7 are represented using the global index notation. The level of the vertices is omitted for simplicity.

Figure 8:
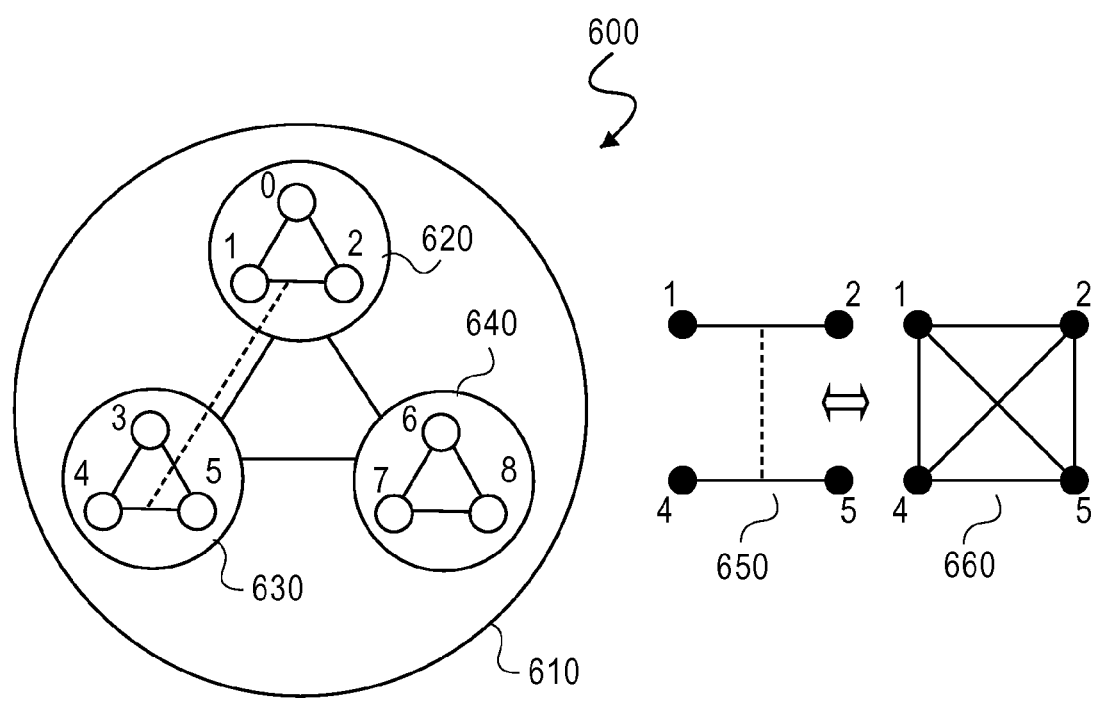
FIG. 8 illustrates another example of a 9 by 9 spanning plane.

An example of a spanning plane 600 is illustrated in FIG. 8. The example shows the graphs 610 built for a 9-by-9 multiplication and the global indexes of all simple vertices. The example also shows the spanning plane 660 defined by the edges $e_{1-2}^{(1)}$ and $e_{4-5}^{(1)}$.

A spanning edge is an edge that connects two vertices $v_{(i_0)(i_1)\ldots(i_{l-1})(i_l)}^{(l)}$ and $v_{(i'_0)(i'_1)\ldots(i'_{l-1})(i'_l)}^{(l)}$ of different graphs of the same level. The local index sequences $i_0, i_1, \ldots, i_l$ and $i'_0, i'_1, \ldots, i'_l$ which describe the two vertices need to satisfy the following conditions:

$$i_0 = i'_0, \ i_1 = i'_1, \ldots, i_q \neq i'_q, \ldots, i_l = i'_l \qquad (37)$$

or (in closed form):

$$(\exists q, \ q \in [0, l-1]: i_q \neq i'_q) \wedge (\forall j \in [0,l], j \neq q: i_j = i'_j) \qquad (38)$$

From the conditions in equation (38) it is evident that a spanning edge connects vertices with the same last local index ($i_l = i'_l$). Second, the vertices which are endpoints of a spanning edge are associated with different graphs of $G^{(l)}$ since $i_q \neq i'_q$. Third, in the special case where $q = l-1$, the two graphs containing the endpoints of a spanning edge map to vertices of the same graph at level $l-1$, since $i_0 = i'_0$, $i_1 = i'_1, \ldots, i_{l-2} = i'_{l-2}$.

A spanning edge can be represented formally using the local index sequence notation as follows:

$$s_{(i_0)(i_1)\ldots(i_q i'_q)\ldots(i_l)}^{e(l)} = \{v_{(i_0)(i_1)\ldots(i_q)\ldots(i_l)}^{(l)}\} + \\ v_{(i_0)(i_1)\ldots(i'_q)\ldots(i_l)}^{(l)} = \{\{v_{(i_0)(i_1)\ldots(i_q)\ldots(i_l)}^{(l)}, \\ v_{(i_0)(i_1)\ldots(i'_q)\ldots(i_l)}^{(l)}\}, \\ e_{(i_0)(i_1)\ldots(i_q)\ldots(i_l)-(i_0)\ldots(i_l)}^{(l)}\} \qquad (39)$$

A spanning edge can be also represented formally using the semi-local index sequence notation:

$$s_{i,i_l-i',i_l}^{e(l)} = \{v_{i,i_l}^{(l)}\} + \{v_{i',i_l}^{(l)}\} = \\ \{\{v_{i,i_l}^{(l)}, v_{i',i_l}^{(l)}\}, e_{i,i_l-i',i}^{(l)}\} \qquad (40)$$

In the definition in equation (40), the value of the index i is given by identity shown in equation (10) and:

$$i' = i_0 \cdot n_1 \cdot n_2 \cdot \ldots \cdot n_{l-1} + i_1 \cdot n_2 \cdot \ldots \cdot n_{l-1} + \ldots + \\ i'_q \cdot n_{q+1} \cdot \ldots \cdot n_{l-1} + \ldots + i_{l-2} \cdot n_{l-2} \cdot n_{l-1} + i_{l-1} \qquad (41)$$

In another embodiment a third way to represent a spanning edge is by using the global index notation:

$$s_{i_g-i'_g}^{e(l)} = \{v_{i_g}^{(l)}\} + \{v_{i'_g}^{(l)}\} = \{\{v_{i_g}^{(l)}, v_{i'_g}^{(l)}\}, e_{i_g-i'_g}^{(l)}\} \qquad (42)$$

To further aid in understanding, a set of mappings defined between edges, spanning edges and spanning planes are introduced. In what follows the term 'corresponding' is used to refer to vertices of different graphs of the same level that are associated with the same last local index. Two edges of different graphs of the same level are called 'corresponding' if they are connecting corresponding endpoints.

A generalized edge (i.e., an edge of a graph $G_i^{(l)}$, $0 \leq l \leq L-1$) or a spanning edge can map to a set of spanning edges and spanning planes through a mapping function $f^{e \to s}$. The function $f^{e \to s}$ accepts as input an edge (if it is a spanning edge, the endpoints are excluded) and returns the set of all possible spanning edges and spanning planes that can be considered between the corresponding vertices and edges of the graphs that map to the endpoints of the input edge through the function $f^{v \to g}$.

Figure 9:
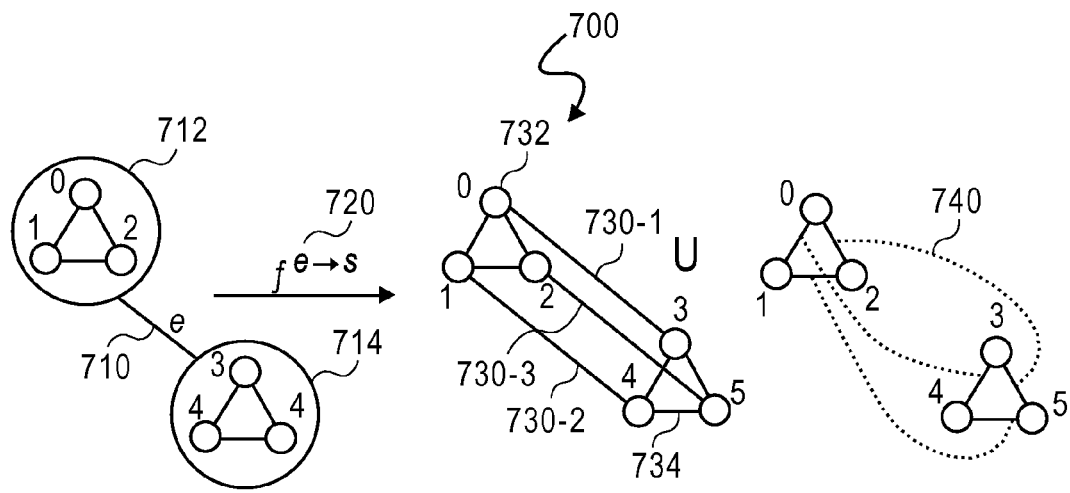
FIG. 9 illustrates an embodiment representation of edge to spanning edge, and spanning plane mapping.

Before the $f^{e \to x}$ mapping is described formally, an example is introduced. In the example 700 illustrated in FIG. 9, the generalized edge e 710 (its level and indexes are omitted for simplicity) connects two vertices (712, 714) that map to the triangles 0-1-2 732 and 3-4-5 734. This mapping is done through the function $f^{v \to g}$. Edge e 710 maps to three spanning edges 730 and three spanning planes 740 as shown in FIG. 9 through the function $f^{e \to s}$. The spanning edges 730 are those connecting the vertices with global indexes 0 and 3 730-1, 1 and 4 730-2, and 2 and 5 730-3 respectively. The spanning planes 740 are those which are produced by the join operation between edges 0-1 and 3-4, 0-2 and 3-5, and 1-2 and 4-5 respectively.

Using the local index sequence location the function $f^{e \to s}$ can be formally defined as:

$$f^{e \to s}(e_{(i_0)\ldots(i_q)\ldots(i_{l-1})(i_l)-(i_0)\ldots(i'_q)\ldots(i_{l-1})(i_l)}^{(l)}) = \\ \{s_{(i_0)\ldots(i_q-i'_q)\ldots(i_{l-1})(i_l)(j)}^{e(l+1)}: 0 \leq j \leq n_{l+1}-1\} \cup \\ \{s_{(i_0)\ldots(i_q-i'_q)\ldots(i_{l-1})(i_l)(j-k)}^{p(l+1)}: 0 \leq j \leq n_{l+1}-1, \\ 0 \leq k \leq n_{l+1}-1, j \neq k\} \qquad (43)$$

In the definition in equation (43) the index position q takes all possible values from the set [0, l].

The mapping $f^{e \to s^e}$ is defined between edges and spanning edges only and the mapping $f^{e \to s^p}$ is defined between edges and spanning planes only.

$$f^{e \to s^e}(e_{(i_0)\ldots(i_q)\ldots(i_{l-1})(i_l)-(i_0)\ldots(i'_q)\ldots(i_{l-1})(i_l)}^{(l)}) = \\ \{s_{(i_0)\ldots(i_q-i'_q)\ldots(i_{l-1})(i_l)(j)}^{e(l+1)}: 0 \leq j \leq n_{l+1}-1\} \qquad (44)$$

and $$f^{e \to s^p}(e_{(i_0)\ldots(i_q)\ldots(i_{l-1})(i_l)-(i_0)\ldots(i'_q)\ldots(i_{l-1})(i_l)}^{(l)}) = \\ \{s_{(i_0)\ldots(i_q-i'_q)\ldots(i_{l-1})(i_l)(j-k)}^{p(l+1)}: 0 \leq j \leq n_{l+1}-1, \\ 0 \leq k \leq n_{l+1}-1, j \neq k\}) \qquad (45)$$

The definitions in equation (44) and equation (45) the index position q takes all possible values from the set [0,l].

In one embodiment mappings between sets of vertices and products are defined. The inputs to a multiplication process of an embodiment are the polynomials a(x) b(x) of degree N−1:

$$a(x) = a_{N-1} \cdot x^{N-1} + a_{N-2} \cdot x^{N-2} + \ldots + a_1 \cdot x + a_0,$$

$$b(x) = b_{N-1} \cdot x^{N-1} + b_{N-2} \cdot x^{N-2} + \ldots + b_1 \cdot x + b_0 \qquad (46)$$

In one embodiment the coefficients of the polynomials a(x) and b(x) are real or complex numbers. In other embodiments the coefficients of the polynomials a(x) and b(x) are elements of a finite field.

The set V of m vertices are defined as:

$$V = \{v_{i_0}, v_{i_1}, \ldots, v_{i_{m-1}}\} \qquad (47)$$

The elements of V are described using the global index notation and their level is omitted for the sake of simplicity. Three mappings P(V), $P_1$(V) and $P_2$(V) are defined between the set V and products as follows:

$$P(V) = (a_{i_0} + a_{i_1} + \ldots + a_{i_{m-1}}) \cdot (b_{i_0} + b_{i_1} + \ldots + b_{i_{m-1}}) \qquad (48)$$

$$P_1(V) = \{a_{i_q} \cdot b_{i_q}: 0 \leq q \leq m-1\} \qquad (49)$$

$$P_2(V) \{(a_i + a_j)(b_i + b_j): i, j \in \{i_0, i_1, \ldots, i_{m-1}\}, i \neq j\} \qquad (50)$$

The product generation process accepts as input two polynomials of degree N−1 as shown in equation (46). The degree N of the polynomials can be factorized as shown in equation (6). The product generation process of an embodiment is the first stage of a two step process which generates a Karatsuba-like multiplication routine that computes c(x)=a(x) b(x). Since the polynomials a(x) and b(x) are of degree N−1, the polynomial c(x) must be of degree 2N−2. The polynomial c(x) is represented as:

$$c(x) = c_{2N-2} \cdot x^{2N-2} + c_{2N-3} \cdot x^{2N-3} + \ldots + c_1 \cdot x + c_0 \quad (51)$$

Where $$c_i = \begin{cases} \sum_{j=0}^{i} a_j \cdot b_{i-j}, & \text{if } i \in [0, N-1] \\ \sum_{j=i-N+1}^{N-1} a_j \cdot b_{i-j}, & \text{if } i \in [N, 2N-2] \end{cases} \quad (52)$$

The expression in equation (52) can be also written as:

$$c_0 = a_0 \cdot b_0$$

$$c_1 = a_0 \cdot b_1 + a_1 \cdot b_0$$

...

$$c_{N-1} = a_{N-1} \cdot b_0 + a_{N-2} \cdot b_1 + \ldots + a_0 \cdot b_{N-1}$$

$$c_N = a_{N-1} \cdot b_1 + a_{N-2} \cdot b_2 + \ldots + a_1 \cdot b_{N-1}$$

...

$$c_{2N-2} = a_{N-1} \cdot b_{N-1} \quad (53)$$

Our framework produces a multiplication process that computes all coefficients $c_0, c_1, \ldots, c_{2N-2}$. At the preprocessing stage, the product generation process generates all graphs $G_i^{(l)}$ for every level l, $0 \leq l \leq L-1$. The generation of products is realized by executing a product creation process of an embodiment, shown in pseudo code as CREATE_PRODUCTS:

```
CREATE_PRODUCTS( )
1. P^a ← Ø
2. for i ← 0 to | G^(L-1) |−1
3.     do P^a ← P^a ∪ P_1(V(G_i^(L-1)))
4.        P^a ← P^a ∪ P_2(V(G_i^(L-1)))
5. GENERALIZED_EDGE_PROCESS( )
6. return P^a
```

The process GENERALIZED_EDGE_PROCESS of an embodiment is described below in pseudo code.

```
GENERALIZED_EDGE_PROCESS( )
1.  for l ← 0 to L−2
2.     do for i ← 0 to | G^(l) |−1
3.         do for j ← 0 to n_l−1
4.            do for k ← 0 to n_l−1
5.               do if j = k
6.                  then
7.                     continue
8.                  else
9.                     S_1 ← f^(e→s^e)(e_{i,j-i,k}^(l))
10.                    S_2 ← f^(e→s^p)(e_{i,j-i,k}^(l))
11.                    if l+1 = L−1
12.                    then
13.                       for every s ∈ S_1 ∪ S_2
14.                          do P^a ← P^a ∪ P(V(s))
15.                    else
16.                       for every s ∈ S_1
17.                          do SPANNING_EDGE_PROCESS(s)
18.                       for every s ∈ S_2
19.                          do SPANNING_PLANE_PROCESS(s)
20. return
```

A shown above, the process GENERALIZED_EDGE_PROCESS( ) processes each generalized edge from the set $G^{(l)}$ one-by-one. If the level of a generalized edge is less than L−2, then the procedure GENERALIZED_EDGE_PROCESS( ) invokes two other processes for processing the spanning edges and spanning planes associated with the generalized edge. The first of the two, SPANNING_EDGE_PROCESS( ), is shown below in pseudo code:

```
SPANNING_EDGE_PROCESS(s)
1.  l ← l(s)
2.  S_1 ← f^(e→s^e)(s)
3.  S_2 ← f^(e→s^p)(s)
4.  if l+1 = L−1
5.  then
6.     for every s' ∈ S_1 ∪ S_2
7.        do P^a ← P^a ∪ P(V(s'))
8.  else
9.     for every s' ∈ S_1
10.       do SPANNING_EDGE_PROCESS(s')
11.    for every s' ∈ S_2
12.       do SPANNING_PLANE_PROCESS(s')
13. return
```

The second process, SPANNING_PLANE_PROCESS( ), is shown below in pseudo code:

```
SPANNING_PLANE_PROCESS(s)
1.  l ← l(s)
2.  if l = L−1
3.  then
4.     P^a ← P^a ∪ P(V(s))
5.  else
6.     ∇ ← { V(s) }
7.     while l < L−1
8.        do ∇ ← EXPAND_VERTEX_SETS(∇)
9.           l ← l+1
10.    for every v' ∈ ∇
11.       do P^a ← P^a ∪ P(v')
12. return
```

In one embodiment the process EXPAND_VERTEX_SETS( ) is shown below in pseudo code. The notation g(v) is used to refer to the global index of a vertex v.

```
EXPAND_VERTEX_SETS(∇)
1. V_r ← Ø
2. for every V' ∈ ∇
3.    do V_r ← V_r ∪ EXPAND_SINGLE_VERTEX_SET(V')
4. return V_r
```

```
EXPAND_SINGLE_VERTEX_SET(V)
1. V_r ← Ø
2. let v ∈ V
3. l ← l(v)
4. for p ← 0 to n_{l+1}−1
5.    do for q ← 0 to n_{l+1}−1
6.       do if p = q
```

-continued

```
7.        then
8.            continue
9.        else
10.           U_pq ← Ø
11.           for i ← 0 to |V|−1
12.           do let v_i ← the i-th element of V
13.               g_i ← g(v_i)
14.               U_pq ← U_pq ∪ {v_{g_i,p}^{(l+1)}} ∪ {v_{g_i,q}^{(l+1)}}
15.               V_r ← V_r ∪ U_pq
16.       for q ← 0 to n_{l+1}−1
17.           do U_q ← Ø
18.           for i ← 0 to |V|−1
19.           do let v_i ← the i-th element of V
20.               g_i ← g(v_i)
21.               U_q ← U_q ∪ {v_{g_i,q}^{(l+1)}}
22.               V_r ← V_r ∪ U_q
23. return V_r
```

In one embodiment for all simple graphs, the products associated with simple vertices and simple edges are determined and these products are added to the set $P^a$. This occurs in lines 3 and 4 of the process CREATE_PRODUCTS( ). Second, for all generalized edges at each level, one embodiment does the following: first, each generalized edge is decomposed into its associated spanning edges and spanning planes. This occurs in lines 9 and 10 of the process GENERALIZED_EDGE_PROCESS( ).

To find products associated with each spanning edge, it is determined if a spanning edge connects simple vertices. If it does, the process computes the product associated with the spanning edge from the global indexes of the endpoints of the edge. This occurs in line 14 of the process GENERALIZED_EDGE_PROCESS( ). If a spanning edge does not connect simple vertices, this spanning edge is further decomposed into its associated spanning edges and spanning planes. This occurs in lines 2 and 3 of the process SPANNING_EDGE_PROCESS( ). For each resulting spanning edge that is not at the last level the process SPANNING_EDGE_PROCESS( ) is performed recursively. This occurs in line 10 of the process SPANNING_EDGE_PROCESS( ).

To find products associated with each spanning plane, it is determined if the vertices of a spanning plane are simple or not. If they are simple, the product associated with the global indexes of the plane's vertices is formed and it is added to the set $P^a$ (line 14 of the process GENERALIZED_EDGE_PROCESS( )). If the vertices of a plane are not simple, then the process expands these generalized vertices into graphs and creates sets of corresponding vertices and edge endpoints. This occurs in lines 14 and 21 of the process EXPAND_SINGLE_VERTEX_SET( ). For each such set the expansion is performed down to the last level. This occurs in lines 7-9 of the process SPANNING_PLANE_PROCESS( ).

There are four types of products created. The first type includes all products created from simple vertices. The set of such products $P_1^a$ is:

$$P_1^a = \{P(\{v_{(i_0)(i_1)\ldots(i_{L-2})(i_{L-1})}^{(L-1)}\}): i_j \in [o, n_j-1]\} \forall j \in [0, L-1]\} \quad (54)$$

A second type of products includes those products formed by the endpoints of simple edges. The set of such products $P_2^a$ is:

$$P_2^a = \{P(\{v_{(i_0)(i_1)\ldots(i_{L-2})(i_{L-1})}^{(L-1)}, v_{(i_0)(i_1)\ldots(i_{L-2})(\hat{i}_{L-1})}^{(L-1)}\}): i_j \in [o, n_j-1] \forall j \in [0, L-1],$$

$$\hat{i}_l \in [0, n_{L-1}-1], i_l \neq \hat{i}_l\} \quad (55)$$

A third type of products includes all products formed by endpoints of spanning edges. These spanning edges result from recursive spanning edge decomposition down to the last level L−1. The set of such products $P_3^a$ has the following form:

$$P_3^a = \{P(\{v_{(i_0)(i_1)\ldots(i_q)\ldots(i_{L-1})}^{(L-1)}, v_{(i_0)(i_1)\ldots(i'_q)\ldots(i_{L-1})}^{(L-1)}\}): i_j \in [o, n_j-1] \forall j \in [0, L-1],$$

$$i'_q \in [0, n_q-1], q \in [0, L-2], i_q \neq i'_q\} \quad (56)$$

A fourth type of products includes those products formed from spanning planes after successive vertex set expansions have taken place. One can show by induction that this set of products $P_4^a$ has the following form:

$$P_4^a = \{P(\{v_{(i_0)\ldots(i_{q0})\ldots(i_{q1})\ldots(i_{qm-1})\ldots(i_{L-1})}^{(L-1)},$$
$$v_{(i_0)\ldots(i'_{q0})\ldots(i_{q1})\ldots(i_{qm-1})\ldots(i_{L-1})}^{(L-1)},$$
$$v_{(i_0)\ldots(i_{q0})\ldots(i'_{q1})\ldots(i_{qm-1})\ldots(i_{L-1})}^{(L-1)},$$
$$v_{(i_0)\ldots(i'_{q0})\ldots(i'_{q1})\ldots(i_{qm-1})\ldots(i_{L-1})}^{(L-1)}, \ldots,$$
$$v_{(i_0)\ldots(i'_{q0})\ldots(i'_{q1})\ldots(i'_{qm-1})\ldots(i_{L-1})}^{(L-1)}\}):$$

$$i_j \in [o, n_j-1] \forall j \in [0, L-1],$$
$$(i'_{q_k} \in [0, n_{q_k}-1] \wedge i_{q_k} \neq i'_{q_k}) \forall k \in [0, m-1],$$

$$0 \leq q_0 \leq q_1 \leq \ldots \leq q_{m-1}, m \in [2, L]\} \quad (57)$$

The set $P_4^a$ consists of all products formed from sets of vertices characterized by identical local indexes apart from those indexes at some index positions $q_0, q_1, \ldots, q_{m-1}$. For these index positions vertices take all possible different values from among the pairs of local indexes: $(i_{q_0}, i'_{q_0})$, $(i_{q_1}, i'_{q_1})$, ..., $(i_{q_{m-1}}, i'_{q_{m-1}})$. All possible $2^m$ local index sequences formed this way are included into the specification of the products of the set $P_4^a$. The number of index positions m for which vertices differ needs to be greater than, or equal to 2. The structure of the set $P_4^a$ is very similar to the structure of the set of all products generated by our process $$P^a \bigcup_{i=1}^{4} P_i^a.$$

The set $P^a$ of all products generated by executing the process CREATE_PRODUCTS is given by the expression in equation (58) below.

The expression in equation (58) is identical to equation (57) with one exception: The number of index positions m for which vertices differ may also take the values 0 and 1. The set $P^a$ results from the union of $P_1^a$, $P_2^a$, $P_3^a$, and $P_4^a$. It can be seen that by adding the elements of $P_1^a$ into $P_4^a$ one covers the case for which m=0. By further adding the elements of $P_2^a$ and $P_3^a$ into $P_4^a$ also covers the case for which m=1.

$$P^a = \{P(\{v_{(i_0)\ldots(i_{q0})\ldots(i_{q1})\ldots(i_{qm-1})\ldots(i_{L-1})}^{(L-1)},$$
$$v_{(i_0)\ldots(i'_{q0})\ldots(i_{q1})\ldots(i_{qm-1})\ldots(i_{L-1})}^{(L-1)},$$
$$v_{(i_0)\ldots(i_{q0})\ldots(i'_{q1})\ldots(i_{qm-1})\ldots(i_{L-1})}^{(L-1)},$$
$$v_{(i_0)\ldots(i'_{q0})\ldots(i'_{q1})\ldots(i_{qm-1})\ldots(i_{L-1})}^{(L-1)}, \ldots,$$
$$v_{(i_0)\ldots(i'_{q0})\ldots(i'_{q1})\ldots(i'_{qm-1})\ldots(i_{L-1})}^{(L-1)}\}):$$

$$i_j \in [o, n_j-1] \forall j \in [0, L-1],$$
$$(i'_{q_k} \in [0, n_{q_k}-1] \wedge i_{q_k} \neq i'_{q_k}) \forall k \in [0, m-1],$$

$$0 \leq q_0 \leq q_1 \leq \ldots \leq q_{m-1}, m \in [0, L]\} \quad (58)$$

The expression in equation (58) is in a closed form that can be used for generating the products without performing spanning plane and spanning edge decomposition. In one embodiment all local index sequences defined in equation (58) are generated and form the products associated with these local index sequences. Spanning edges and spanning planes offer a graphical interpretation of the product generation process and can help with visualizing product generation for small operand sizes (e.g., N=9 or N=18).

The number of elements in the set $P^a$ generated by executing the process CREATE_PRODUCTS is equal to the number of scalar multiplications performed by generalized recursive Karatsuba for the same operand size N, and factors $n_0, n_1, \ldots, n_{L-1}$, such that $N = n_0 \cdot n_1 \cdot \ldots \cdot n_{L-1}$.

This is true because the number of scalar multiplications performed by generalized recursive Karatsuba as defined by Paar and Weimerskirch is:

$$|P^r| = \frac{n_0 \cdot (n_0 + 1)}{2} \cdot \frac{n_1 \cdot (n_1 + 1)}{2} \cdot \ldots \cdot \frac{n_{L-1} \cdot (n_{L-1} + 1)}{2} \quad (59)$$

$$= \frac{\prod_{i=0}^{L-1} n_i \cdot (n_i + 1)}{2^L}$$

In equations (54)-(57) the sets $P_1^a, P_2^a, P_3^a$ and $P_4^a$ do not contain any common elements. Therefore, the cardinality $|P^a|$ of the set $P^a$ is given by:

$$|P^a| = \sum_{i=1}^{4} |P_i^a| \quad (60)$$

The set $P_1^a$ contains all products formed by sets which contain a single vertex only. Each single vertex is characterized by some arbitrary local index sequence. Hence the cardinality $|P_1^a|$ of the set $P_1^a$ is given by:

$$|P_1^a| = n_0 \cdot n_1 \cdot \ldots \cdot n_{L-1} = \prod_{i=0}^{L-1} n_i \quad (61)$$

The set $P_2^a$ contains products formed by sets which contain two vertices. These vertices are characterized by identical local indexes for all index positions apart from the last one L−1. Since the number of all possible pairs of distinct values that can be considered from 0 to $n_{L-1}-1$ is $n_{L-1} \cdot (n_{L-1}-1)/2$, the cardinality of the set $P_2^a$ is equal to:

$$|P_2^a| = \frac{n_0 \cdot n_1 \cdot \ldots \cdot n_{L-1} \cdot (n_{L-1}-1)}{2} = \left(\prod_{i=0}^{L-1} n_i\right) \cdot \frac{(n_{L-1}-1)}{2} \quad (62)$$

The set $P_3^a$ contains products formed by sets which contain two vertices as well. The products of the set $P_3^a$ are formed differently from $P_2^a$, however. The vertices that form the products of $P_3^a$ are characterized by identical local indexes for all index positions apart from one position between 0 and L−2. Since the number of all possible pairs of local index values the can be considered for an index position j is $n_j \cdot (n_j-1)/2$, the cardinality of the set $P_3^a$, is equal to:

$$|P_3^a| = \frac{n_0 \cdot (n_0-1)}{2} \cdot n_1 \cdot n_2 \cdot \ldots \cdot n_{L-1} + n_0 \cdot \quad (63)$$

$$\frac{n_1 \cdot (n_1-1)}{2} \cdot n_2 \cdot \ldots \cdot n_{L-1} + \ldots + n_0 \cdot n_1 \cdot n_2 \cdot \ldots \cdot$$

$$\frac{n_{L-2} \cdot (n_{L-2}-1)}{2} \cdot n_{L-1}$$

$$= \left(\prod_{i=0}^{L-1} n_i\right) \cdot \sum_{i=0}^{L-2} \frac{n_i - 1}{2}$$

Finally, the set $P_4^a$ is characterized by the expression in equation (57). The cardinality of the set $P_4^a$ is equal to:

$$|P_4^a| = \frac{n_0 \cdot (n_0-1)}{2} \cdot \frac{n_1 \cdot (n_1-1)}{2} \cdot n_2 \cdot n_3 \cdot \ldots \cdot n_{L-1} + \quad (64)$$

$$n_0 \cdot \frac{n_1 \cdot (n_1-1)}{2} \cdot \frac{n_2 \cdot (n_2-1)}{2} \cdot n_3 \cdot \ldots \cdot n_{L-1} + \ldots +$$

$$n_0 \cdot n_1 \cdot \ldots \cdot \frac{n_{L-2} \cdot (n_{L-2}-1)}{2} \cdot \frac{n_{L-1} \cdot (n_{L-1}-1)}{2} +$$

$$\frac{n_0 \cdot (n_0-1)}{2} \cdot \frac{n_1 \cdot (n_1-1)}{2} \cdot \frac{n_2 \cdot (n_2-1)}{2} \cdot n_3 \cdot n_4 \cdot \ldots \cdot n_{L-1} +$$

$$\frac{n_0 \cdot (n_0-1)}{2} \cdot \frac{n_1 \cdot (n_1-1)}{2} \cdot n_2 \cdot \frac{n_3 \cdot (n_3-1)}{2} \cdot n_4 \cdot \ldots \cdot n_{L-1} + \ldots +$$

$$n_0 \cdot n_1 \cdot \ldots \cdot \frac{n_{L-3} \cdot (n_{L-3}-1)}{2} \cdot \frac{n_{L-2} \cdot (n_{L-2}-1)}{2} \cdot \frac{n_{L-1} \cdot (n_{L-1}-1)}{2} +$$

$$\ldots + \frac{n_0 \cdot (n_0-1)}{2} \cdot \frac{n_1 \cdot (n_1-1)}{2} \cdot \ldots \cdot \frac{n_{L-1} \cdot (n_{L-1}-1)}{2}$$

Summing up the cardinalities of the sets $P_1^a, P_2^a, P_3^a$ and $P_4^a$:

$$|P^a| = \sum_{i=1}^{4} |P_i^a| = \quad (65)$$

$$\frac{n_0 \cdot n_1 \cdot \ldots \cdot n_{L-1}}{2^L} \cdot [2^L + 2^{L-1} \cdot [(n_0-1) + (n_1-1) + \ldots + (n_{L-1}-1)]$$

$$2^{L-2} \cdot [(n_0-1) \cdot (n_1-1) + (n_0-1) \cdot (n_2-1) + \ldots +$$

$$(n_{L-2}-1) \cdot (n_{L-1}-1)] + \ldots +$$

$$(n_0-1) \cdot (n_1-1) \cdot \ldots \cdot (n_{L-1}-1)$$

To prove that $|P^r|=|P^a|$ the identity that follows is used:

$$(a_0+k) \cdot (a_1 s+k) \cdot \ldots \cdot (a_{m-1}+k) =$$
$$k^m + k^{m-1} \cdot (a_0 + a_1 + \ldots + a_{m-1}) +$$
$$k^{m-2} \cdot (a_0 \cdot a_1 + a_0 \cdot a_2 + \ldots +$$
$$a_{m-2} \cdot a_{m-1}) + \ldots + a_0 \cdot a_1 \cdot \ldots \cdot a_{m-1} \quad (66)$$

By substituting $a_i$ with $(n_i-1)$, m with L, and k with 2 in equation (65) and by combining equation (65) and equation (66) results in equation (67):

$$|P^a| = \frac{n_0 \cdot n_1 \cdot \ldots \cdot n_{L-1}}{2^L} \cdot (n_0 - 1 + 2) \cdot (n_1 - 1 + 2) \cdot \ldots \cdot \quad (67)$$

$$(n_{L-1} - 1 + 2)$$

$$= \frac{\prod_{i=0}^{L-1} n_i \cdot (n_i + 1)}{2^L}$$

$$= |P^r|$$

Therefore, it is proven that the number of products generated by an embodiment process is equal to the number of multiplication performed by using a generalized recursive Karatsuba process. It should be noted that the number of products generated by an embodiment process is substantially smaller than the number of scalar multiplication performed by the one-iteration Karatsuba solution of Paar and Weimerskirch (A. Weimerskirch and C. Paar, "Generalizations of the Karatsuba Algorithm for Efficient Implementations", *Technical Report*, University of Ruhr, Bochum, Germany, 2003), which is $N \cdot (N+1)/2$.

A typical product p from the set $P^\alpha$ is $$p = P(\{v_{(i_0)\ldots(i_{q0})\ldots(i_{q1})\ldots(i_{qm-1})\ldots(i_{L-1})}^{(L-1)},$$
$$v_{(i_0)\ldots(i'_{q0})\ldots(i_{q1})\ldots(i_{qm-1})\ldots(i_{L-1})}^{(L-1)},$$
$$v_{(i_0)\ldots(i_{q0})\ldots(i'_{q1})\ldots(i_{qm-1})\ldots(i_{L-1})}^{(L-1)}, \ldots,$$
$$v_{(i_0)\ldots(i'_{q0})\ldots(i'_{q1})\ldots(i'_{qm-1})\ldots(i_{L-1})}^{(L-1)}\});$$

$i_j \in [0, n_j-1] \forall j \in [0, L-1]$, $(i'_{q_k} \in [0, n_{q_k}-1] \wedge i_{q_k} \neq i'_{q_k}) \forall k \in [0, m-1]$, $0 \leq q_0 \leq q_1 \leq \ldots \leq q_{m-1}, m \in [0, L]$ (68)

For the product p, a 'surface' in the m−k dimensions ($0 \leq k \leq m$) associated with 'free' index positions $q_{f_0}, q_{f_1}, \ldots, q_{f_{m-k-1}}$, 'occupied' index positions $q_{p_0}, q_{p_1}, \ldots, q_{p_{k-1}}$, and indexes for the occupied positions $\hat{i}_{q_{p_0}}, \hat{i}_{q_{p_1}}, \ldots, \hat{i}_{q_{p_{k-1}}}$ is defined as the product that derives from p by setting the local indexes of all vertices of p to be equal to $\hat{i}_{q_{p_0}}, \hat{i}_{q_{p_1}}, \ldots, \hat{i}_{q_{p_{k-1}}}$ at the occupied index positions, and by allowing the indexes at the free positions to take any value between $i_{q_{f0}}$ and $i'_{q_{f0}}$, and $i'_{q_{f1}}, \ldots, i_{q_{fm-k-1}}$ and $i'_{q_{fm-k-1}}$.

The sets of the free and occupied index positions satisfy the following conditions:

$\{q_{f_0}, q_{f_1}, \ldots, q_{f_{m-k-1}}\} \subset \{q_0, q_1, \ldots, q_{m-1}\}$, $\{q_{p_0}, q_{p_1}, \ldots, q_{p_{k-1}}\} \subset \{q_0, q_1, \ldots, q_{m-1}\}$, $\{q_{f_0}, q_{f_1}, \ldots, q_{f_{m-k-1}}\} \cap \{q_{p_0}, q_{p_1}, \ldots, q_{p_{k-1}}\} = \emptyset$, $\{q_{f_0}, q_{f_1}, \ldots, q_{f_{m-k-1}}\} \cup \{q_{p_0}, q_{p_1}, \ldots, q_{p_{k-1}}\} = \{q_0, q_1, \ldots, q_{m-1}\}$ (69)

In addition the indexes for the occupied positions $\hat{i}_{q_{p_0}}, \hat{i}_{q_{p_1}}, \ldots, \hat{i}_{q_{p_{k-1}}}$ satisfy:

$\hat{i}_{q_{p_0}} \in \{i_{q_{p_0}}, i'_{q_{p_0}}\}, \hat{i}_{q_{p_1}} \in \{i_{q_{p_1}}, i'_{q_{p_1}}\}, \ldots, \hat{i}_{q_{p_{k-1}}} \in \{i_{q_{p_{k-1}}}, i'_{q_{p_{k-1}}}\}$ (70)

Such surface is denoted as $$u_{q_{f_0}, q_{f_1}, \ldots, q_{f_{m-k-1}}; q_{p_0}, q_{p_1}, \ldots, q_{p_{k-1}}}^{p; m-k; \hat{i}_{q_{p_0}}, \hat{i}_{q_{p_1}}, \ldots, \hat{i}_{q_{p_{k-1}}}}.$$

The formal definition of a surface $$u_{q_{f_0}, q_{f_1}, \ldots, q_{f_{m-k-1}}; q_{p_0}, q_{p_1}, \ldots, q_{p_{k-1}}}^{p; m-k; \hat{i}_{q_{p_0}}, \hat{i}_{q_{p_1}}, \ldots, \hat{i}_{q_{p_{k-1}}}}$$

is given in equation (71) below.

From the definition of equation (71) is it evident that a surface $$u_{q_{f_0}, q_{f_1}, \ldots, q_{f_{m-k-1}}; q_{p_0}, q_{p_1}, \ldots, q_{p_{k-1}}}^{p; m-k; \hat{i}_{q_{p_0}}, \hat{i}_{q_{p_1}}, \ldots, \hat{i}_{q_{p_{k-1}}}}$$

associated with a product p is also an element of the set $P^\alpha$ and is generated by the procedure CREATE_PRODUCTS. From the definition in equation (71) is it also evident that whereas p is formed by a set of $2^m$ vertices, the surface $$u_{q_{f_0}, q_{f_1}, \ldots, q_{f_{m-k-1}}; q_{p_0}, q_{p_1}, \ldots, q_{p_{k-1}}}^{p; m-k; \hat{i}_{q_{p_0}}, \hat{i}_{q_{p_1}}, \ldots, \hat{i}_{q_{p_{k-1}}}}$$

is formed by a set of $2^{m-k}$ vertices. Finally, from the definition of the mapping in equation (48) and equation (71) it is evident that $$u_{q_{f_0}, q_{f_1}, \ldots, q_{f_{m-k-1}}; q_{p_0}, q_{p_1}, \ldots, q_{p_{k-1}}}^{p; m-k; \hat{i}_{q_{p_0}}, \hat{i}_{q_{p_1}}, \ldots, \hat{i}_{q_{p_{k-1}}}} < p. \quad (71)$$

$$u_{q_{f_0}, q_{f_1}, \ldots, q_{f_{m-k-1}}; q_{p_0}, q_{p_1}, \ldots, q_{p_{k-1}}}^{p; m-k; \hat{i}_{q_{p_0}}, \hat{i}_{q_{p_1}}, \ldots, \hat{i}_{q_{p_{k-1}}}} =$$

$$P\Big(\Big\{v_{(i_0)\ldots(\hat{i}_{q_{p_0}})\ldots(i_{q_{f_0}})\ldots(i_{q_{f_1}})\ldots(i_{q_{f_{m-k-1}}})\ldots(\hat{i}_{q_{p_{k-1}}})\ldots(i_{L-1})}^{(L-1)},$$

$$v_{(i_0)\ldots(\hat{i}_{q_{p_0}})\ldots(i'_{q_{f_0}})\ldots(i_{q_{f_1}})\ldots(i_{q_{f_{m-k-1}}})\ldots(\hat{i}_{q_{p_{k-1}}})\ldots(i_{L-1})}^{(L-1)},$$

$$v_{(i_0)\ldots(\hat{i}_{q_{p_0}})\ldots(i_{q_{f_0}})\ldots(i'_{q_{f_1}})\ldots(i_{q_{f_{m-k-1}}})\ldots(\hat{i}_{q_{p_{k-1}}})\ldots(i_{L-1})}^{(L-1)},$$

$$v_{(i_0)\ldots(\hat{i}_{q_{p_0}})\ldots(i'_{q_{f_0}})\ldots(i'_{q_{f_1}})\ldots(i_{q_{f_{m-k-1}}})\ldots(\hat{i}_{q_{p_{k-1}}})\ldots(i_{L-1})}^{(L-1)}, \ldots,$$

$$v_{(i_0)\ldots(\hat{i}_{q_{p_0}})\ldots(i'_{q_{f_0}})\ldots(i'_{q_{f_1}})\ldots(i'_{q_{f_{m-k-1}}})\ldots(\hat{i}_{q_{p_{k-1}}})\ldots(i_{L-1})}^{(L-1)}\Big\}\Big):$$

$\{i_{q_{f0}}, i_{q_{f1}}, \ldots, i_{q_{fm-k-1}}\} \in \{i_{q_0}, i_{q_1}, \ldots, i_{q_{m-1}}\}$, $\{i'_{q_{f0}}, i'_{q_{f1}}, \ldots, i'_{q_{fm-k-1}}\} \in \{i'_{q_0}, i'_{q_1}, \ldots, i'_{q_{m-1}}\}$ and conditions (65) and (66) hold}

The set of all surfaces in the m−k dimensions associated with a product p, free index positions $q_{f_0}, q_{f_1}, \ldots, q_{f_{m-k-1}}$, and occupied index positions $q_{p_0}, q_{p_1}, \ldots, q_{p_{k-1}}$ are defined as the union:

$$U_{q_{f_0},q_{f_1},\ldots,q_{f_{m-k-1}};q_{p_0},q_{p_1},\ldots,q_{p_{k-1}}}^{p;m-k} = \quad (72)$$

$$\bigcup_{\hat{i}_{q_{p_0}},\hat{i}_{q_{p_1}},\ldots,\hat{i}_{q_{p_{k-1}}}} u_{q_{f_0},q_{f_1},\ldots,q_{f_{m-k-1}};q_{p_0},q_{p_1},\ldots,q_{p_{k-1}}}^{p;m-k;\hat{i}_{q_{p_0}},\hat{i}_{q_{p_1}},\ldots,\hat{i}_{q_{p_{k-1}}}}$$

Next, the set of all surfaces in the m−k dimensions associated with a product p are defined as the union:

$$U^{p;m-k} = \bigcup_{\substack{q_{f_0},q_{f_1},\ldots,q_{f_{m-k-1}},\\q_{p_0},q_{p_1},\ldots,q_{p_{k-1}}}} U_{q_{f_0},q_{f_1},\ldots,q_{f_{m-k-1}};q_{p_0},q_{p_1},\ldots,q_{p_{k-1}}}^{p;m-k} \quad (73)$$

A 'parent' surface $\wp(u)$ of a particular surface $$u = u_{q_{f_0},q_{f_1},\ldots,q_{f_{m-k-1}};q_{p_0},q_{p_1},\ldots,q_{p_{k-1}}}^{p;m-k;\hat{i}_{q_{p_0}},\hat{i}_{q_{p_1}},\ldots,\hat{i}_{q_{p_{k-1}}}}$$

is defined as the surface associated with the product p, occupied index positions $q_{p_0}, q_{p_1}, \ldots, q_{p_{k-2}}$, free index positions $q_{f_0}, q_{f_1}, \ldots, q_{f_{m-k-1}}, q_{p_{k-1}}$, and indexes at the occupied positions $\hat{i}_{q_{p_0}}, \hat{i}_{q_{p_1}}, \ldots, \hat{i}_{q_{p_{k-2}}}$:

$$\wp(u) = u_{q_{f_0},q_{f_1},\ldots,q_{f_{m-k-1}},q_{p_{k-1}};q_{p_0},q_{p_1},\ldots,q_{p_{k-2}}}^{p;m-k+1;\hat{i}_{q_{p_0}},\hat{i}_{q_{p_1}},\ldots,\hat{i}_{q_{p_{k-2}}}} \quad (74)$$

The set of 'children' of a surface $u \in U^{p;m-k}$ is defined as the set:

$$l(u) = \{v: v \in U^{p;m-k-1}, u = \wp(v)\} \quad (75)$$

In one embodiment, a process that generates subtraction formulae uses a matrix M which size is equal to the cardinality of $P^a$, i.e., the number of all products generated by the procedure CREATE_PRODUCTS( ). The cardinality of $P^a$ is also equal to the number of unique surfaces that can be defined in all possible dimensions for all products of $P^a$. This is because each surface of a product is also a product by itself. For each possible product p, or surface u, the matrix M is initialized as M[p]←p, or equivalently M[u]←u. Initialization takes place every time a set of subtractions is generated for a product p of $P^a$.

Subtractions are generated by a generate subtractions process GENERATE_SUBTRACTIONS( ), which pseudo code is listed below. The subtraction formulae which are generated by generate subtractions process GENERATE_SUBTRACTIONS( ) are returned in the set $S^a$.

```
1. GENERATE_SUBTRACTIONS( )
2.    S^a ← ∅
3.    for every p ∈ P^a
4.       do INIT_M( )
5.          GENERATE_SUBTRACTIONS_FOR_PRODUCT(p)
6.    return S^a
```

The procedure INIT_M( ) is listed below:

```
INIT_M( )
1. for every p ∈ P^a
2.    do M[p] ← p
3. return
```

A process GENERATE_SUBTRACTIONS_FOR_PRODUCT( ), that is also invoked by GENERATE_SUBTRACTIONS( ), is listed below in pseudo code:

```
GENERATE_SUBTRACTIONS_FOR_PRODUCT(p)
1. m ← the number free index positions in p
2. for l ← 0 to m−1
3.    for every u_l ∈ U^{p;l}
4.    
5.       do s ← (M[℘(u_l)] ← M[℘(u_l)]− M[u_l])
6.          if s ∉ S^a
7.          then
8.             S^a ← S^a ∪ s
9. return
```

For each product p of $P^a$ the subtractions generated by a process GENERATE_SUBTRACTIONS( ) reduce its value. Let $\mu(p)$ the final value of the table entry M[p] after the procedure GENERATE_SUBTRACTIONS_FOR_PRODUCT( ) is executed for the product p. It can be seen that $\mu(p)$ is in fact the product p minus all surfaces of p defined in the m−1 dimensions, plus all surfaces of p defined in the m−2 dimensions, ..., minus (plus) all surfaces of p defined in 0 dimensions (i.e., products of single vertices). By m it is meant that the number of free index positions of p.

Next, it is determined how the subtractions generated by the process GENERATE_SUBTRACTIONS( ) can be interpreted graphically. Consider an example of an 18 by 18 multiplication. One of the products generated by the procedure CREATE_PRODUCTS( ) is formed from the set of vertices with global indexes 0, 1, 6, 7, 9, 10, 15, 16. This is the product $(a_0+a_1+a_6+a_7+a_9+a_{10}+a_{15}+a_{16}) \cdot (b_0+b_1+b_6+b_7+b_9+b_{10}+b_{15}+b_{16})$.

Figure 10:
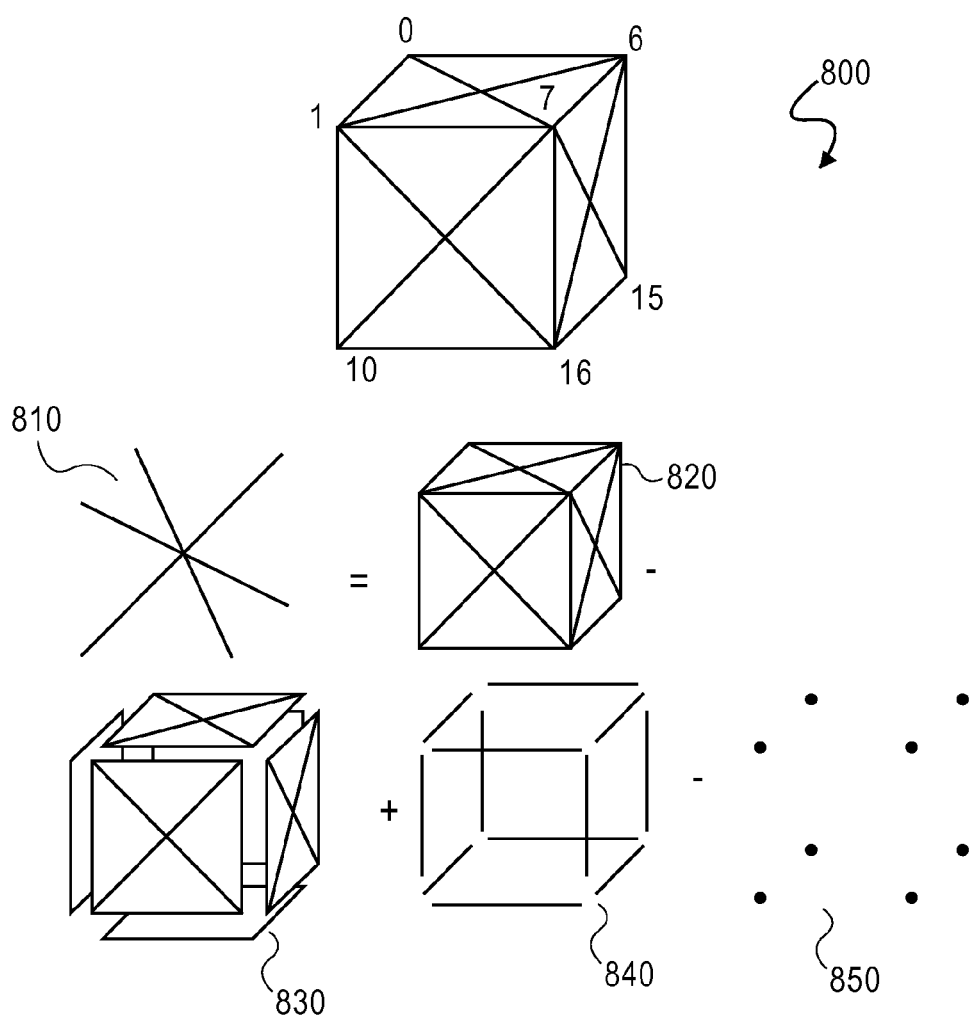
FIG. 10 illustrates a graphical representation of subtraction generation of an embodiment.

Consider the complete graph which is formed from the vertices of this product. This graph 800 has the shape of a cube but it also contains the diagonals that connect every other vertex, as shown in FIG. 10. The product has 6 associated surfaces defined in 2 dimensions, 12 surfaces defined in 1 dimension and 8 surfaces defined in 0 dimensions. The surfaces defined in 2 dimensions are the products $(a_0+a_1+a_6+a_7) \cdot (b_0+b_1+b_6+b_7)$, $(a_0+a_1+a_9+a_{10}) \cdot (b_0+b_1+b_9+b_{10})$, $(a_6+a_7+a_{15}+a_{16}) \cdot (b_6+b_7+b_{15}+b_{16})$, $(a_9+a_{10}+a_{15}+a_{16}) \cdot (b_9+b_{10}+b_{15}+b_{16})$, $(a_1+a_7+a_{10}+a_{16}) \cdot (b_1+b_7+b_{10}+b_{16})$, and $(a_0+a_6+a_9+a_{15}) \cdot (b_0+b_6+b_9+b_{15})$. These products are formed from sets of 4 vertices. The complete graphs of these sets form squares which together with their diagonals cover the cube associated with the product $(a_0+a_1+a_6+a_7+a_9+a_{10}+a_{15}+a_{16}) \cdot (b_0+b_1+b_6+b_7+b_9+b_{10}+b_{15}+b_{16})$. This is the reason why the term 'surfaces' is used to refer to such products.

The surfaces defined in a single dimension are the products $(a_0+a_1) \cdot (b_0+b_1)$, $(a_0+a_6) \cdot (b_0+b_6)$, $(a_1+a_7) \cdot (b_1+b_7)$, $(a_6+a_7) \cdot (b_6+b_7)$, $(a_9+a_{10}) \cdot (b_9+b_{10})$, $(a_9+a_{15}) \cdot (b_9+b_{15})$, $(a_{10}+a_{16}) \cdot (b_{10}+b_{16})$, $(a_{15}+a_{16}) \cdot (b_{15}+b_{16})$, $(a_1+a_{10}) \cdot (b_1+b_{10})$, $(a_0+a_9) \cdot (b_0+b_9)$, $(a_7+a_{16}) \cdot (b_7+b_{16})$, and $(a_6+a_{15}) \cdot (b_6+b_{15})$. These products are formed from sets of 2 vertices. The complete graphs of these sets form the edges of the cube associated with the product $(a_0+a_1+a_6+a_7+a_9+a_{10}+a_{15}+a_{16})(b_0+b_1+b_6+b_7+b_9+b_{10}+b_{15}+b_{16})$. Finally, the surfaces defined in 0 dimensions are products formed from single vertices. These are the products $a_0 \cdot b_0$, $a_1 \cdot b_1$, $a_6 \cdot b_6$, $a_7 \cdot b_7$, $a_9 \cdot b_9$, $a_{10} \cdot b_{10}$, $a_{15} \cdot b_{15}$, and $a_{16} \cdot b_{16}$.

Next, it is determined what remains if from the product $(a_0+a_1+a_6+a_7+a_9+a_{10}+a_{15}+a_{16}) \cdot (b_0+b_1+b_6+b_7+b_9+b_{10}+b_{15}+b_{16})$ are subtracted all the surfaces defined in 2 dimensions, added all surfaces defined in 1 dimension and subtracted all surfaces defined in 0 dimensions. It can be seen that what remains is the term $a_0 \cdot b_{16}+a_{16} \cdot b_0+a_1 \cdot b_{15}+a_{15} \cdot b_1+a_6 \cdot b_{10}+a_{10} \cdot {}^*b_6+a_9 \cdot b_7+a_7 \cdot b_9$. This term is part of the coefficient $c_{16}$ of the output. The derivation of this term can be interpreted graphically as the subtraction of all covering squares from a cube, the addition of its edges and the subtraction of its vertices. What remains from these subtractions are the diagonals of the cube, excluding their end-points.

To prove the correctness of the embodiments, it is shown that every term $\mu(p)$ produced by the subtractions of the process GENERATE_SUBTRACTIONS( ) is part of one coefficient of a Karatsuba output $c(x)$. It is also shown that for two different products $p, \tilde{p} \in P^a$, the terms $\mu(p)$ and $\mu(\tilde{p})$ do not include common terms of the form $a_{i_1} \cdot b_{i_2}+a_{i_2} \cdot b_{i_1}$. Also, it is shown that each term of the form $a_{I_1} b_{I_2}+a_{I_2} \cdot b_{I_1}$ of every coefficient of the Karatsuba output $c(x)$ is part of some term $\mu(p)$ resulting from a product $p \in P^a$.

Consider a product $p \in P^a$ defined by equation (68). If $m>0$, then $\mu(p)$ is the sum of all possible terms of the form $a_{I_1} \cdot b_{I_2}+a_{I_2} \cdot b_{I_1}$ that satisfy the following conditions:

$$I_1 = i_0 \cdot n_1 \cdot \ldots \cdot N_{L-1} + \ldots + \hat{i}_{q_0} \cdot n_{q_0+1} \cdot \ldots \cdot n_{l-1} + \ldots + \hat{i}_{q_{m-1}} \cdot n_{q_{m-1}+1} \cdot \ldots \cdot n_{l-1} + \ldots + i_{L-1},$$

$$I_2 = i_0 \cdot n_1 \cdot \ldots \cdot n_{L-1} + \ldots + \check{i}_{q_{m-1}} \cdot n_{q_{m-1}+1} \cdot \ldots \cdot n_{l-1} + \ldots + i_{L-1},$$

$$\hat{i}_{q_0}, \check{i}_{q_0} \in \{i_{q_0}, i'_{q_0}\}, \hat{i}_{q_0} \neq \check{i}_{q_0}, \ldots, \hat{i}_{q_{m-1}}, \check{i}_{q_{m-1}} \in \{i_{q_{m-1}}, i'_{q_{m-1}}\}, \hat{i}_{q_{m-1}} \neq \check{i}_{q_{m-1}} \quad (76)$$

This means that $\mu(p)$ is the sum of all terms of the form $a_{I_1} \cdot b_{I_2}+a_{I_2} \cdot b_{I_1}$ such that the global index $I_1$ in each term $a_{I_1} \cdot b_{I_2}+a_{I_2} \cdot b_{I_1}$ is created by selecting some local index values $\hat{i}_{q_0}, \ldots, \hat{i}_{q_{m-1}}$ from among $\{i_{q_0},i'_{q_0}\}, \ldots, \{i_{q_{m-1}},i'_{q_{m-1}}\}$, whereas the global index $I_2$ in the same term is created by selecting those local index values not used by $I_1$.

From equation (68) it is evident that the product p is the sum of terms which are either of the form $a_{I_1} \cdot b_{I_2}+a_{I_2} \cdot b_{I_1}$ or $a_{I_1} \cdot b_{I_1}$. The term $\mu(p)$ is derived from p by sequentially subtracting and adding surfaces of $m-1, m-2, \ldots, 0$ dimensions. These surfaces are also sums of terms of the forms $a_{I_1} \cdot b_{I_2}+a_{I_2} \cdot b_{I_1}$ or $a_{I_1} \cdot b_{I_1}$ (from equation (71)). In addition every term of the forms $a_{I_1} \cdot b_{I_2}+a_{I_2} \cdot b_{I_1}$ or $a_{I_1} \cdot b_{I_1}$ of every surface of p is included in p.

Next, it is shown that $\mu(p)$ does not contain terms of the form $a_{I_1} \cdot b_{I_1}$ and that the terms of the form $a_{I_1} \cdot b_{I_2}+a_{I_2} \cdot b_{I_1}$ satisfy equation (76). Assume for the moment that there exist a term $a_{I_1} \cdot b_{I_2}+a_{I_2} \cdot b_{I_1}$ in $\mu(p)$ that does not satisfy equation (76). For this term, there exists a subset of local index positions $\{q_{e_0}, q_{e_1}, \ldots, q_{e_{l-1}}\} \in \{q_0, q_1 \ldots, q_{m-1}\}$ for which the global indexes $I_1$ and $I_2$ are associated with the same local index values. Because of this reason this term is part of $$\binom{l}{l}$$

surfaces of m dimensions, $$\binom{l}{l-1}$$

surfaces of $m-1$ dimensions $$\binom{l}{l-2}$$

surfaces of $m-2$ dimensions, ..., and $$\binom{l}{0}$$

surfaces of $m-1$ dimensions. From the manner in which the mapping $P(V)$ is defined, it evident that the term $a_{I_1} \cdot b_{I_2}+a_{I_2} \cdot b_{I_1}$ appears only once in each of these surfaces. Therefore the total number of times $N_L$ this term appears in $\mu(p)$ is given by:

$$N_L = \left| \binom{l}{l} - \binom{l}{l-1} + \binom{l}{l-2} - \ldots + (-1)^l \cdot \binom{l}{l} - (-1)^l \cdot \binom{l}{0} \right| \quad (77)$$

Using Newton's binomial formula:

$$(x+a)^n = a^n + \binom{n}{1} \cdot a^{n-1} \cdot x + \binom{n}{2} \cdot a^{n-2} \cdot x^2 + \ldots + \binom{n}{1} \cdot a \cdot x^{n-1} + x^n \quad (78)$$

Substituting x with 1, a with $-1$ and n with l we get that $N_L=0$. Hence $\mu(p)$ does not contain any terms of the form $a_{I_1} \cdot b_{I_2}+a_{I_2} \cdot b_{I_1}$ that do not satisfy equation (77). What remains is to show that $\mu(p)$ does not contain terms of the form $a_{I_1} \cdot b_{I_1}$. Every term of the form $a_{I_1} \cdot b_{I_1}$ is part of $$\binom{m}{m}$$

surfaces of m dimensions, $$\binom{m}{m-1}$$

surfaces of $m-1$ dimensions, $$\binom{m}{m-2}$$

surfaces of $m-2$ dimensions, ..., and $$\binom{m}{0}$$

surfaces 0 dimensions. Therefore, the total number of times a term $a_{I_1} \cdot b_{I_1}$ appears in $\mu(p)$ is zero (from Newton's binomial formula).

The term $\mu(p)$ contains all possible terms of the form $a_{I_1} \cdot b_{I_2} + a_{I_2} \cdot b_{I_1}$ by that satisfy equation (76). This is because these terms are part of p and they are not included into any surface of p. Therefore, these terms are not subtracted out when $\mu(p)$ is derived.

Consider a product $p \in P^a$ defined by equation (68). The sum of terms $\mu(p)$ is part of the coefficient $c_{i_c}$ of the Karatsuba output where the index $i_c$ is given by equation (79).

First consider the case where m>0. In this case, $\mu(p)$ is a sum of terms of the form $a_{I_1} \cdot b_{I_2} + a_{I_2} \cdot b_{I_1}$ that satisfy equation (76). In this case $I_1 + I_2 = i_c$ for every term $a_{I_1} \cdot b_{I_2} + a_{I_2} \cdot b_{I_1}$. In the second case where m=0, the product p is formed from a single vertex. Therefore, $p = \mu(p) = a_{I_1} \cdot b_{I_1}$ for some global index $I_1$. In this case, $2 \cdot I_1 = i_c$.

$$i_c = 2 \cdot i_0 \cdot n_1 \cdot n_2 \cdot \ldots \cdot n_{L-1} + \ldots + (i_{q_0} + i'_{q_0}) \cdot n_{q_0+1} \cdot n_{q_0+2} \cdot \ldots \cdot \qquad (79)$$
$$n_{L-1} + \ldots + (i_{q_1} + i'_{q_1}) \cdot n_{q_1+1} \cdot n_{q_1+2} \cdot \ldots \cdot n_{L-1} + \ldots +$$
$$(i_{q_{m-1}} + i'_{q_{m-1}}) \cdot n_{q_{m-1}+1} \cdot n_{q_{m-1}+2} \cdot \ldots \cdot n_{L-1} + \ldots + 2 \cdot i_{L-1}$$

Next we show that the terms $\mu(p)$ and $\mu(\tilde{p})$ that derive from two different products $p, \tilde{p} \in P^a$ do not include any common terms.

Consider the products $p, \tilde{p} \in P^a$. The terms $\mu(p)$ and $\mu(\tilde{p})$ that derive from these products have no terms of the form $a_{I_1} \cdot b_{I_2} + a_{I_2} \cdot b_{I_1}$ or $a_{I_1} \cdot b_{I_1}$ in common.

In the trivial case where the number of free index positions of both p and $\tilde{p}$ is zero, $p = \mu(p)$, $\tilde{p} = \mu(\tilde{p})$ and $p \neq \tilde{p}$. In the case where one of the two products is characterized by zero free index positions and the other is not, then it is not possible for $\mu(p)$, $\mu(\tilde{p})$ to contain common terms since one of the two is equal to $a_{I_1} \cdot b_{I_1}$ for some global index $I_1$ and the other is the sum of terms $a_{I_1} \cdot b_{I_2} + a_{I_2} \cdot b_{I_1}$ that satisfy equation (77).

Now, assume that both p and $\tilde{p}$ are characterized by at least one free index position and that there exist two terms $a_{I_1} \cdot b_{I_2} + a_{I_2} \cdot b_{I_1}$ and $a_{\tilde{I}_1} \cdot b_{\tilde{I}_2} + a_{\tilde{I}_2} \cdot b_{\tilde{I}_1}$ from $\mu(p)$ and $\mu(\tilde{p})$ respectively that are equal. Equality of global indexes means equality of their associated sequences of local indexes. The local index positions for which $I_1$ and $I_2$ (or $\tilde{I}_1$ and $\tilde{I}_2$) differ are free index positions for both p and $\tilde{p}$. On the other hand, all other local index positions must be occupied. Indeed, if any of these index positions was free, then the local index sequences associated with $I_1$ and $I_2$ would differ at that position, but they do not. Therefore, the products p and $\tilde{p}$ are defined using the same free and occupied local index positions. Now, from the equality of the local index sequences of $I_1$ and $I_2$ it is evident that p and $\tilde{p}$ specify the same pairs of local index values at their free index positions and the same single values at their occupied positions. Therefore, p and $\tilde{p}$ are equal, which contradicts the assumption.

Every term of the form $a_{I_1} \cdot b_{I_2} + a_{I_2} \cdot b_{I_1}$ of a coefficient of the Karatsuba output is part of a term $\mu(p)$ for some product $p \in P^a$. The global indexes $I_1$ and $I_2$ can be converted into 2 local index sequences. These sequences will be identical for some local index positions and different for others. A product p can be completely defined in this case from $I_1$ and $I_2$ by specifying the local index positions for which $I_1$ and $I_2$ differ as free and all others as occupied. The pairs of local index values for which $I_1$ and $I_2$ differ are specified at the free index positions of all vertices of the product p, whereas the local index values which are in common between $I_1$ and $I_2$ are specified at the occupied positions. From the manner in which the product p is specified it is evident that $\mu(p)$ contains the term $a_{I_1} \cdot b_{I_2} + a_{I_2} \cdot b_{I_1}$.

Figure 11A:
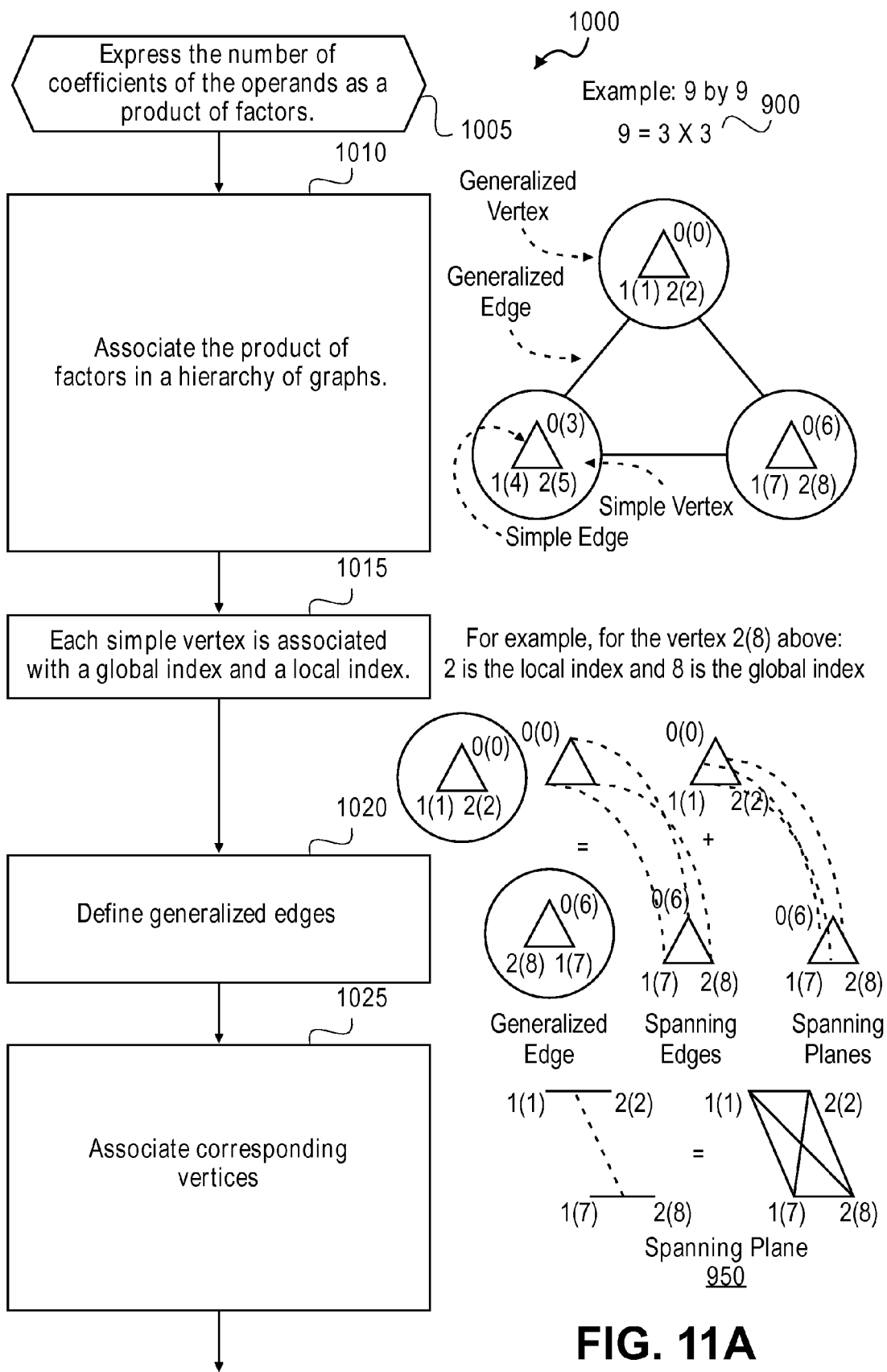
FIG. 11A-B illustrate a block diagram of an embodiment.
Figure 11B:
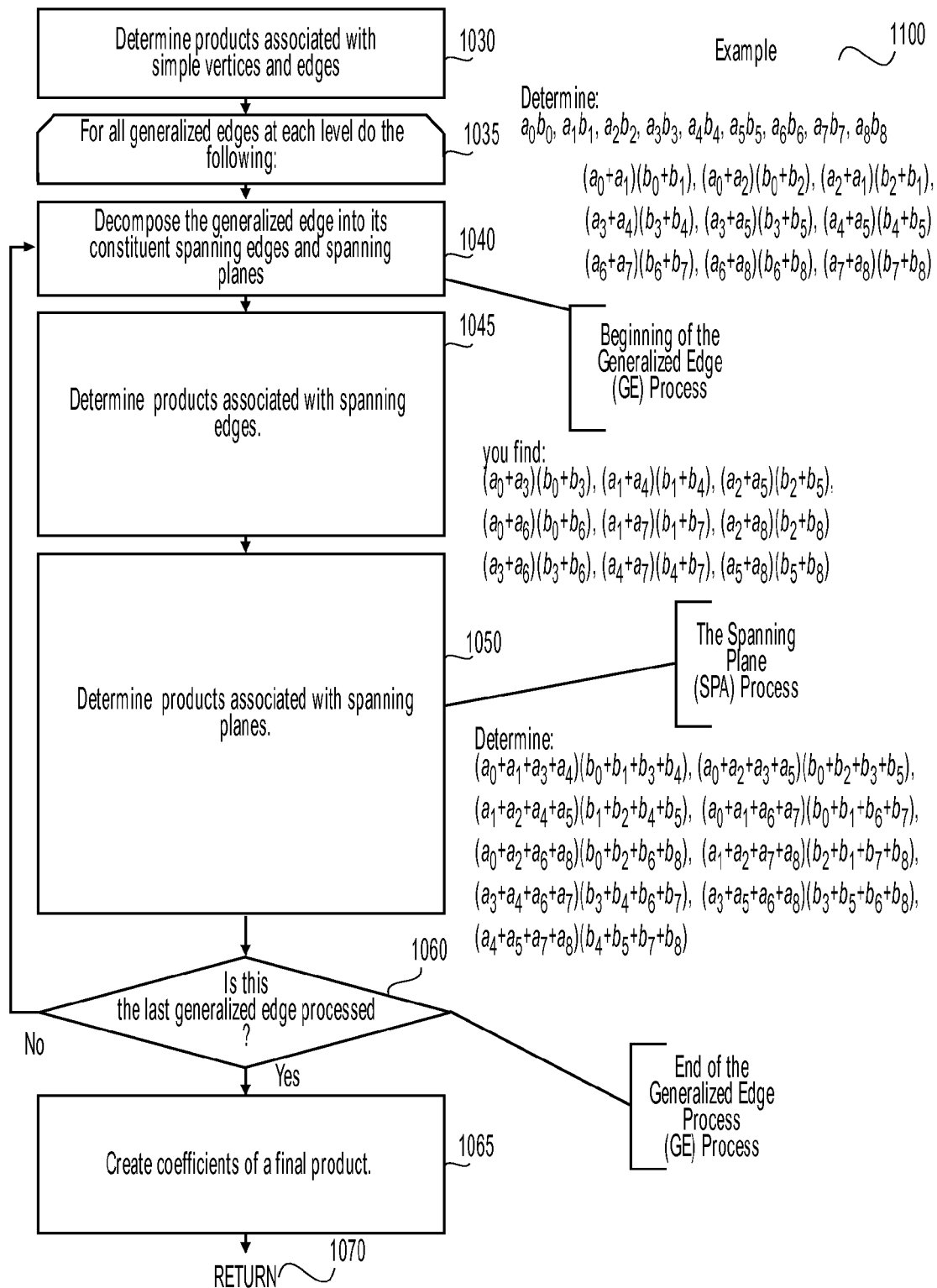

In what follows we refer to the example of FIG. 11B. We describe the steps by which a single iteration multiplication is performed between two polynomials of degree 8. Additions connect the "a" terms and the "b" terms 6, 7 and 8 in order to form the nodes of the triangle 6-7-8. Additions connect the "a" terms and the "b" terms 3, 4 and 5 to form the triangle 3-4-5. Additions connect the "a" terms and the "b" terms 0, 1 and 2 to form the triangle 0-1-2. Additions connect 1-by-1 the "a" and "b" terms 6-7-8 and 3-4-5. Additions connect 1-by-1 the "a" and "b" terms 6-7-8 and 0-1-2. Additions connect 1-by-1 the "a" and "b" terms 3-4-5 and 0-1-2. Additions create the spanning planes associated the edges of the triangles 6-7-8 and 3-4-5. Additions create the spanning planes associated with the edges of the triangles 6-7-8 and 0-1-2. Additions create the spanning planes associated with the edges of the edges of the triangles 3-4-5 and 0-1-2.

Multiplications create the nodes of the triangles 0-1-2, 3-4-5, and 6-7-8. Multiplications create the edges of the triangle 6-7-8. Multiplications create the edges of the triangle 3-4-5. Multiplications create the edges of the triangle 0-1-2. Multiplications create the edges that connect the nodes of the triangles 6-7-8 and 3-4-5. Multiplications create the edges that connect the nodes of the triangles 6-7-8 and 0-1-2. Multiplications create the edges that connect the nodes of the triangles 3-4-5 and 0-1-2. Multiplications create the spanning planes that connect the edges of the triangles 6-7-8 and 3-4-5. Multiplications create the spanning planes that connect the edges of the triangles 6-7-8 and 0-1-2. Multiplications create the spanning planes that connect the edges of the triangles 3-4-5 and 0-1-2.

Subtractions are performed, associated with the edges of the triangle 6-7-8. Subtractions are performed, associated with the edges of the triangle 3-4-5. Subtractions are performed, associated with the edges of the triangle 0-1-2. Subtractions are performed, associated with the edges that connect the nodes of the triangles 6-7-8 and 3-4-5. Subtractions are performed, associated with the edges that connect the nodes of the triangles 6-7-8 and 0-1-2. Subtractions are performed, associated with the edges that connect the nodes of the triangles 3-4-5 and 0-1-2. Subtractions are performed, associated with the spanning planes that connect the edges of the triangles 6-7-8 and 3-4-5. Subtractions are performed, associated with the spanning planes that connect the edges of the triangles 6-7-8 and 0-1-2. Finally, subtractions are performed, associated with the spanning planes that connect the edges of the triangles 3-4-5 and 0-1-2.

Additions create the coefficients of the resulting polynomial. Next the polynomial is converted to a big number.

FIGS. 11A-B illustrates a block diagram and graphical illustration of process of an embodiment. Process 1000 starts with block 1105 where the number of coefficients of operands are expressed as a product of factors. It should be noted that the graphical illustration is an example for a 9×9 operation. In block 1010, each of the factors is associated with a level in a hierarchy of interconnected graphs. At each level of the hierarchy, a fully connected graph (i.e., generalized graphs having generalized vertices and generalized edges) has as many vertices as the factor associated with the level. At the last level of the hierarchy there exist simple graphs with simple interconnected vertices and simple edges.

In block 1015, each simple vertex is associated with a global index and a last level local index. In block 1020, generalized edges are defined consisting of a number of spanning edges and spanning planes. In block 1025, a spanning edge is an edge between two corresponding generalized (or simple) vertices. Corresponding vertices are associated with the same last level local index but different global indexes. A spanning plane is a fully connected graph interconnecting four generalized (or simple) vertices.

In block 1030, for all graphs interconnecting simple vertices, the products associated with simple vertices and simple edges are determined. Block 1135 starts a loop between blocks 1040, 1045, 1050 and 1060, where each block is performed for all generalized edges at each level.

In block 1040, a generalized edge is decomposed into its constituent spanning edges and spanning planes. In block 1045, the products associated with spanning edges are determined. If a spanning edge connects simple vertices, the product associated with the edge from the global indexes of the edge's adjacent vertices is formed. Otherwise the products associated with spanning edges are determined by treating each spanning edge as a generalized edge and applying a generalized edge process (blocks 1040 and 1045) recursively.

In block 1050, to determine products associated with spanning planes, process 1010 examines if the vertices of the plane are simple or not. If they are simple, the product associated with the global indexes of the planes vertices is formed and returned. If the vertices are not simple, the generalized vertices are expanded into graphs and sets of corresponding vertices and edges are created. Corresponding edges are edges interconnecting vertices with the same last level local index but different global index. For each set, the vertices which are elements of the set are used for running the spanning plane process (block 1050) recursively.

In block 1060, it is determined whether the last generalized edge has been processed by blocks 1040, 1045 and 1050. If the last edge has not been processed, process 1010 returns to block 1040. If the last edge has been processed, process 1010 continues with block 1065. In block 1065, for all the graphs associated with products created, (i.e., edges, squares, cubes, hyper-cubes, etc.) the periphery is subtracted and the diagonals are used to create coefficients of a final product. Process 1010 then proceeds with returning the final product at 1070.

Next a comparison of four one-iteration multiplication techniques: the Montgomery approach to Karatsuba (P. Montgomery, "Five, Six and Seven-Term Karatsuba-like Formulae", *IEEE Transactions on Computers*, March 2005), the Paar and Weimerskirch approach, an embodiment and the schoolbook way. These techniques are compared in terms of the number of scalar multiplications each technique requires for representative operand sizes. From the numbers shown in FIG. 12 it is evident that an embodiment process outperforms all alternatives which are widely applicable to many different operand sizes. For some of the odd input sizes embodiments generate formulae for the input size minus 1 (which is even) and then use the Paar and Weimerskirch technique to generate products and subtractions for the additional input term.

Carry-less big number multiplication is used by popular cryptographic algorithms like Rivest, Shamir, & Adleman (RSA). The embodiment processes avoid the cost of recursion. The embodiments correlate between graph properties (i.e. vertices, edges and sub-graphs) and the Karatsuba-like terms of big number multiplication routines and these embodiments generate and use one iteration Karatsuba-like multiplication processes for any given operand size which require the same scalar operations as recursive Karatsuba, without recursion. Embodiments are associated with the least possible number of 'scalar' multiplications. By scalar multiplications it is meant multiplications between 'slices' of big numbers or coefficients of polynomials. The embodiments can generate optimal, 'one-iteration', Karatsuba-like formulae using graphs. Reduction of the carry big number multiplication modulo an irreducible polynomial that defines an EC-crypto system is now described.

Figure 13:
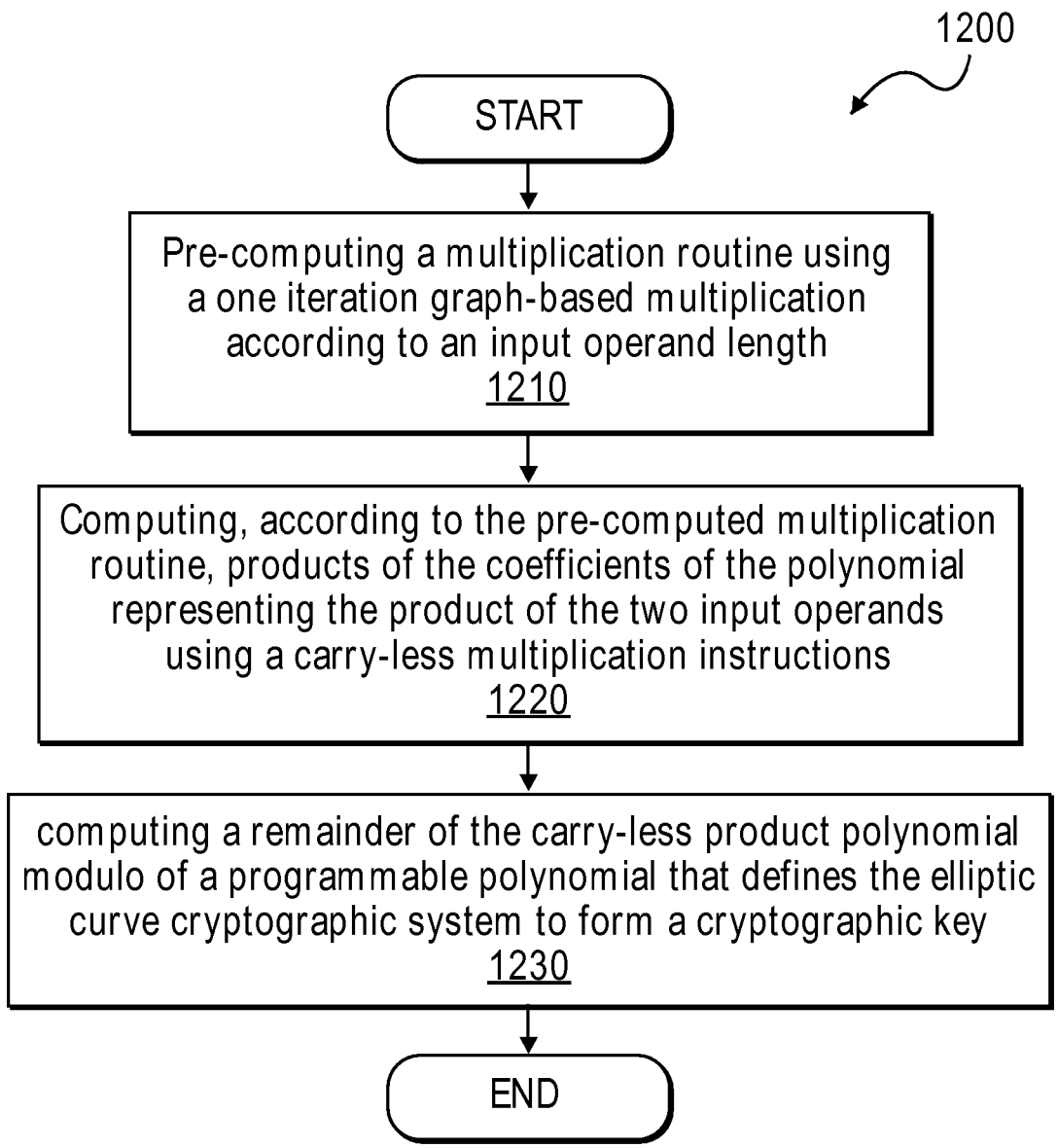
FIG. 13 is a flowchart illustrating a method for computing a remainder of a carry-less product of two input operands according to one embodiment.

FIG. 13 is a flowchart illustrating a method for computing a remainder of a carry-less product of two polynomials of large degree modulo an irreducible polynomial that defines a cryptographic system, according to one embodiment. Representatively, at process block 1210, a multiplication routine is pre-computed using a one iteration based multiplication according to an input operand length. In one embodiment, the graph-based multiplication routine may be performed according to any of the embodiments illustrated with reference to FIGS. 1-11. At process block 1220, products of the coefficients of a polynomial representing the product of two input operands are computed according to the pre-computed multiplication routine using a carry-less multiplication instruction available from an architecture. In one embodiment, the carry-less multiplication is directionless, for example, a 64-bit/32-bit carry-less multiplication instruction, for example, as shown in Table 1. At process block 1230, a remainder of the carry-less product polynomial modulo, a programmable polynomial is computed where the programmable polynomial defines the elliptic curve cryptographic system and the remainder forms a cryptographic key. A method for computing the remainder of the carry-less product is illustrated with reference to the flowchart of FIG. 14.

In one embodiment, to reduce the carry-less product of two polynomials of large degree (e.g., 233) we split it into two parts of equal length. In one embodiment, the least significant half is just XOR-ed with the final remainder. For the most significant part, one embodiment realizes division via two multiplications. This algorithm can be seen as an extension of the Barrett (P. Barrett, "Implementing the Revest, Shamir and Adleman Public Key Encryption Algorithm on a Standard Digital Signal Processor", *Master's Thesis*, University of Oxford, UK, 1986) reduction algorithm to modulo-2 arithmetic or the Feldmeier CRC generation algorithm (D. Feldmeier, "Fast Software Implementation of Error Correcting Codes", *IEEE Transactions on Networking*, December, 1995) to dividends and divisors of arbitrary size. In one embodiment, we need not take into account the least significant half of the input, we investigate the efficient generation of a remainder p(x) defined as follows:

$$p(x) = c(x) \cdot x^t \bmod g(x) \tag{80}$$

Here, c(x) is a polynomial of degree s−1 with coefficients in GF(2), representing the most significant bits of the carry-less product.

t is the degree of the polynomial g.

g(x) is the irreducible polynomial of the finite field used

For the polynomials p(x), c(x), and g(x) we write:

$$c(x) = c_{s-1} x^{s-1} + c_{s-2} x^{s-2} + \ldots + c_1 x + c_0,$$

$$p(x) = p_{t-1} x^{t-1} + p_{t-2} x^{t-2} + \ldots + p_1 x + p_0, \text{ and}$$

$$g(x) = g_t x^t + g_{t-1} x^{t-1} + \ldots + g_1 x + g_0 \tag{81}$$

Hereafter, we use the notation $L^u(v)$ to denote the coefficients of the u least significant terms of the polynomial v and $M^u(v)$ to denote the coefficients of its u most significant terms. The polynomial p(x) can be expressed as:

$$p(x) = c(x) \cdot x^t \bmod g(x) = g(x) \cdot q(x) \bmod x^t \tag{82}$$

where q(x) is a polynomial of degree s−1 equal to the quotient from the division of $c(x) \cdot x^t$ with g. The intuition behind equation (82) is that the t least significant terms of the dividend $c(x) \cdot x^t$ equal zero.

Further, the dividend $c(x) \cdot x^t$ can be expressed as the sum of the polynomials $g \cdot q$ and $p$:

$$c(x) \cdot x^t = g(x) \cdot q(x) + p(x) \qquad (83)$$

where operator '+' means XOR ('$\oplus$'). From equation (83) one can expect that the t least significant terms of the polynomial $g \cdot q$ are equal to the terms of the polynomial p. Only if these terms are equal to each other, the result of the XOR operation $g \cdot q \oplus p$ is zero for its t least significant terms. Hence:

$$p(x) = g(x) \cdot q(x) \bmod x^t = L^t(g(x) \cdot q(x)) \qquad (84)$$

Now we define:

$$g(x) = g_t x^t \oplus g^*(x) \qquad (85)$$

The polynomial g* represents the t least significant terms of the polynomial g. Obviously, $$p(x) = L^t(g(x) \cdot q(x)) = L^t(q(x) \cdot g^*(x) + q(x) \cdot g_t x^t) \qquad (86)$$

However, the t least significant terms of the polynomial $q \cdot g_t \cdot x^t$ are zero. Therefore, $$p(x) = L^t(q(x) \cdot g^*(x)) \qquad (87)$$

From equation (87) it follows that compute the remainders we need to know the value of the quotient q. The quotient can be calculated in a similar manner as in the Barrett reduction algorithm:

$$(9) \Leftrightarrow c(x) \cdot x^{t+s} = g(x) \cdot q(x) \cdot x^s + p(x) \cdot x^s \qquad (88)$$

Let $$x^{t+s} = g(x) \cdot q^+(x) + p^+(x) \qquad (89)$$

where $q^+$ is an s-degree polynomial equal to the quotient from the division of $x^{t+s}$ with g and $p^+$ is the remainder from this division. The degree of the polynomial $p^+$ is t−1.

From equations (88) and (89) we get:

$$\left.\begin{array}{c}(15)\\(16)\end{array}\right\} \Leftrightarrow c(x) \cdot g(x) \cdot q^+(x) + c(x) \cdot p^+(x) = g(x) \cdot q(x) \cdot x^s + p(x) \cdot x^s \qquad (90)$$

and $$(17) \Leftrightarrow M^s\!\left(\begin{array}{c}c(x) \cdot g(x) \cdot\\ q^+(x) + c(x) \cdot p^+(x)\end{array}\right) = M^s\!\left(\begin{array}{c}g(x) \cdot q(x) \cdot\\ x^s + p(x) \cdot x^s\end{array}\right) \qquad (91)$$

One can see that the polynomials $c \cdot g \cdot q^+$ and $g \cdot q \cdot x^s$ are of degree $t+2 \cdot s-1$ the polynomial $c \cdot p^+$ is of degree $t+s-2$, and the polynomial $p \cdot x^s$ is of degree $t+s-1$. As a result the s most significant terms of the polynomials in the left and right hand side of equation (91) are not affected by the polynomials $c \cdot p^+$ and $p \cdot x^s$. Hence, $$(18) \Leftrightarrow M^s(c(x) \cdot g(x) \cdot q^+(x)) = M^s(g(x) \cdot q(x) \cdot x^s) \qquad (92)$$

Next, we authorize that the s most significant terms of the polynomial $c \cdot g \cdot q^+$ are equal to the s most significant terms of the polynomial $g \cdot M^s(c \cdot q^+) \cdot x^s$. The polynomial $M^s(c \cdot q^+) \cdot x^s$ results from $c \cdot q^+$ by replacing the s least significant terms of this polynomial with zeros. The intuition behind this observation is the following: the s most significant terms of the polynomial $c \cdot g \cdot q^+$ are calculated by adding the s most significant terms of the polynomial $c \cdot q^+$ with each other in as many offset positions as defined by the terms of the polynomial g. Thus, the s most significant terms of $c \cdot g \cdot q^+$ do not depend on the s least significant terms of $c \cdot q^+$, and consequently, $$(19) \Leftrightarrow M^s(g(x) \cdot M^s(c(x) \cdot q^+(x)) \cdot x^s) = M^s(g(x) \cdot q(x) \cdot x^s) \qquad (93)$$

Equation (93) is satisfied for q given by:

$$q = M^s(c(x) \cdot q^+(x)) \qquad (94)$$

Since there is a unique quotient q satisfying equation (83) one can show that there is a unique quotient q satisfying equation (93). As a result this quotient q must be equal to $M^s(c(x) \cdot q^+(x))$.

It follows that the polynomial p is found by $$p(x) = L^t(g^*(x) \cdot M^s(c(x) \cdot q^+(x))) \qquad (95)$$

Figure 14:
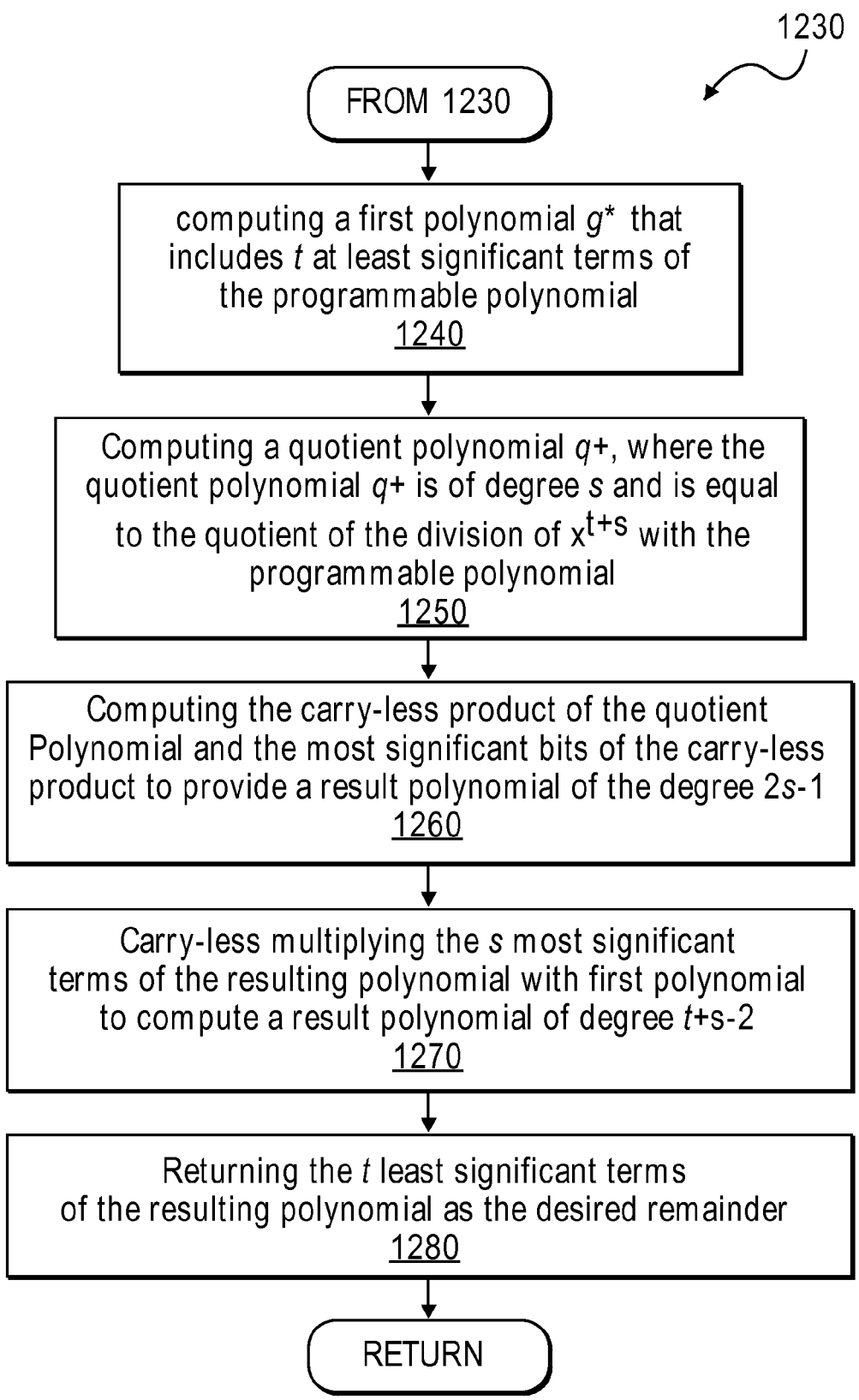
FIG. 14 is a flowchart illustrating a method for computing a remainder of FIG. 13 according to one embodiment.
Figure 15:
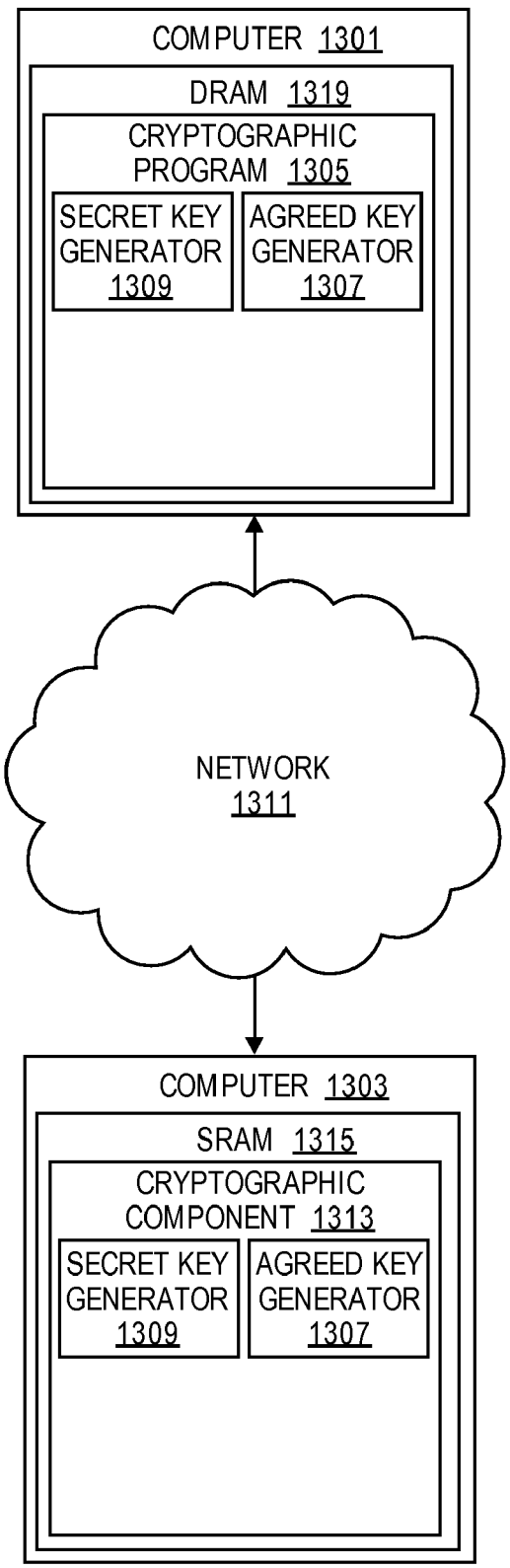
FIG. 15 illustrates an embodiment of an apparatus in a system.

Equation (95) indicates the algorithm for computing the polynomial p may be performed as described with reference to FIG. 14. FIG. 14 is a flowchart illustrating a method for computing and reducing a remainder of the carry-less product polynomial modulo, a programmable polynomial of process block 1230 of FIG. 13 according to one embodiment. Representatively, process blocks 1240 and 1260 may be pre-computed and used during the calculation reduction of the remainder of the carry-less product modulo and a reducible polynomial of a cryptographic system.

For the given irreducible polynomial g the polynomials g* and $q^+$ are computed first. Representatively, at process block 1240, the polynomial g* is of degree t−1 and is computed as the t least significant terms of g. At process block 1250 the polynomial $q^+$ is of degree s and is equal to the quotient of the division of $x^{t+s}$ with the polynomial g.

At process block 1260, the input c is multiplied with $q^+$. The result is a polynomial of degree 2s−1. At process block 1270, the s most significant terms of the polynomial resulting from step 1 are multiplied with g*. The result is a polynomial of degree t+s−2. At process block 1280, the algorithm returns the t least significant terms of the polynomial resulting from step 2. This is the desired remainder.

TABLE 2

Galois field multiplication for the NIST B-233 curve

```
int mod_multiplication(WORD_TYPE *a,
            WORD_TYPE *b,
            WORD_TYPE *result)
{
    WORD_TYPE S_0, S_1, S_2, S_3, S_4, S_5, S_6, S_7, S_8, S_9;
    WORD_TYPE P_0_0, P_0_1, P_1_0, P_1_1;
    WORD_TYPE P_2_0 P_2_1, P_3_0, P_3_1, P_4_0, P_4_1;
    WORD_TYPE P_5_0, P_5_1, P_6_0, P_6_1, P_7_0, P_7_1, P_8_0, P_8_1;
    WORD_TYPE D_0_0, D_0_1, D_1_0, D_1_1;
    WORD_TYPE L_0, L_1, L_2, L_3;
    WORD_TYPE U_0, U_1, U_2, U_3;
    WORD_TYPE V_0, V_1, V_2, V_3;
    cmul64_instr_3_clocks(P_0_0, P_0_1, a[0], b[0]);
    cmul64_instr_3_clocks(P_1_0, P_1_1, a[1], b[1]);
    cmul64_instr_3_clocks(P_2_0, P_2_1, a[2], b[2]);
```

TABLE 2-continued

Galois field multiplication for the NIST B-233 curve

```
    cmul64_instr_3_clocks(P_3_0, P_3_1, a[3], b[3]);
    S_0 = a[0] ^ a[1];
    S_1 = a[2] ^ a[3];
    S_2 = a[0] ^ a[2];
    S_3 = a[1] ^ a[3];
    S_4 = b[0] ^ b[1];
    S_5 = b[2] ^ b[3];
    S_6 = b[0] ^ b[2];
    S_7 = b[1] ^ b[3];
    cmul64_instr_3_clocks(P_4_0, P_4_1, S_0, S_4);
    cmul64_instr_3_clocks(P_5_0, P_5_1, S_1, S_5);
    cmul64_instr_3_clocks(P_6_0, P_6_1, S_2, S_6);
    cmul64_instr_3_clocks(P_7_0, P_7_1, S_3, S_7);
    S_8 = S_0 ^ S_1;
    S_9 = S_4 ^ S_5;
    cmul64_instr_3_clocks(P_8_0, P_8_1, S_8, S_9);
    D_0_0 = P_6_0 ^ P_0_0 ^ P_2_0;
    D_0_1 = P_6_1 ^ P_0_1 ^ P_2_1;
    D_1_0 = P_7_0 ^ P_1_0 ^ P_3_0;
    D_1_1 = P_7_1 ^ P_1_1 ^ P_3_1;
    L_0 = P_0_0;
    L_1 = P_0_1 ^ P_4_0 ^ P_0_0 ^ P_1_0;
    L_2 = P_4_1 ^ P_0_1 ^ P_1_1 ^ D_0_0 ^ P_1_0;
    L_3 = D_0_1 ^ P_1_1 ^ P_8_0 ^ P_4_0 ^ P_5_0 ^ D_0_0 ^ D_1_0;
    U_0 = P_8_1 ^ P_4_1 ^ P_5_1 ^ D_0_1 ^ D_1_1 ^ D_1_0 ^ P_2_0;
    U_1 = D_1_1 ^ P_2_1 ^ P_5_0 ^ P_2_0 ^ P_3_0;
    U_2 = P_5_1 ^ P_2_1 ^ P_3_1 ^ P_3_0;
    U_3 = P_3_1;
    //now we update U; Essentially we perform the first stage of
    //carry-less extensions to barrett
    V_0 = (L_3 >> 41) | (U_0 << 23);
    V_1 = (U_0 >> 41) | (U_1 << 23);
    V_2 = (U_1 >> 41) | (U_2 << 23);
    V_3 = (U_2 >> 41) | (U_3 << 23);
    U_0 = V_0 ^ ((V_2 >> 31) | (V_3 << 33));
    U_1 = V_1 ^ (V_3 >> 31);
    U_2 = V_2;
    U_3 = V_3;
    //next we update V; second stage of carry-less Barrett
    V_0 = U_0;
    V_1 = U_1 ^ (U_0 << 10);
    V_2 = U_2 ^ ((U_1 << 10) | (U_0 >> 54));
    V_3 = U_3 ^ ((U_2 << 10) | (U_1 >> 54));
    //finally we put the result together
    result[0] = V_0 ^ L_0;
    result[1] = V_1 ^ L_1;
    result[2] = V_2 ^ L_2;
    result[3] = V_3 ^ L_3;
    result[3] &= MASK_L41;
    return 1;
}
```

For many the elliptic curve crypto systems recommended by NIST the polynomial g is a trinomial. Hence the polynomials g* and q+ contain only two digits equal to '1'. Hence the entire reduction algorithm can be implemented at the cost of three 233 bit-wide shift and XOR operations. The code for implementing Galois field multiplication for the curve NISR B-233 is listed in Table 2.

TABLE 1

Comparison between our technique and the OpenSSL implementation.

| Implementation | Cost of NIST B-233 Diffie Hellman Latency (Crypto Only) | Cost of NIST B-233 Diffie Hellman Latency (Application Level) |
| --- | --- | --- |
| OpenSSL | 4.6 million clocks | 5.6 million clocks |
| Our Code (Software Only) | 2.6 million clocks | 3.6 million clocks |
| Our Code (Using a 9-clock carry-less multiplier) | 220,000 clocks | 1,220,000 clocks |
| Our Code (Using a 3-clock carry-less multiplier) | 70,000 clocks | 1,070,000 clocks |
| Implementation | Gain (Crypto Only) | Gain (Application Level) |
| Sun/OpenSSL | 1 | 1 |
| Our Code (Software Only) | 77% | 55% |
| Our Code (Using a 9-clock carry-less multiplier) | 21X | 4.6X |

TABLE 1-continued

Comparison between our technique and the OpenSSL implementation.

| Implementation | Cost of NIST B-233 Diffie Hellman Latency (Crypto Only) | Cost of NIST B-233 Diffie Hellman Latency (Application Level) |
|---|---|---|
| Our Code (Using a 3-clock carry-less multiplier) | 66X | 5.2X |

In Table 2 we present the performance of the point times scalar multiplication operation which constitutes the main part of an Elliptic Curve-based Diffie Hellman key exchange using the Sun implementation of OpenSSL, our software improvements, and our proposed hardware assist. The processor used is a Pentium 4 processor at 3.6 GHz. As can be seen our approach offers substantial acceleration which ranges from 55% to 5.2× depending on whether a GFMUL instruction is introduced to the CPU or not. Further optimizations can remove much of the application level overhead (e.g, OpenSSL BN structure management and function call overhead) ideally accelerating the prototype by 66×. Practically, we believe that a 10× acceleration is possible with further refinement of the code. Such exercise, however, is left for future work.

The embodiments described have some advantages over existing methods because it is highly flexible and enables high performance elliptic curve processing. This can help opening new markets for companies (e.g., packet by packet public key cryptography). Furthermore the improved method can even influence companies to take leadership steps in the crypto and networking. For example, the proposed instruction accelerates both Elliptic Curve cryptography and the GCM mode of AES. In this way, high performance public key operations and message authenticity can be accelerated using the same hardware assists. Currently used hash family SHA* scales badly because its state increases with digest length. This gives strong motivation for companies to move to AES-based authenticity schemes and for the penetration of AES-based schemes into the security products market.

The embodiments described presented a new approach for implementing Galois field multiplication for Characteristic 2 Elliptic Curves. The new ingredients are an efficient reduction method combined with using a GFMUL instruction, currently not part of the instruction set of processors and single iteration extensions to the Karatsuba multiplication algorithm. Currently, software implementations do not use Karatsuba and Barrett because the cost of such algorithms when implemented the straightforward way. Hardware approaches found in cryptographic processors perform the reduction step using a tree of XOR gates specific to the polynomial of the finite field. This approach is field specific and not suitable for general purpose processor implementations. Our approach, on the other had, is novel and accelerates characteristic 2 Elliptic Curve cryptography without introducing field-specific functionality into the CPU. We believe that our work has some importance because of its associated measured acceleration gain and may pave the way for further innovations for high speed security in the future Internet.

Embodiments of the present invention may be implemented using hardware, software, or a combination thereof and may be implemented in one or more computer systems or other processing systems. In one embodiment, the invention is directed toward one or more computer systems capable of carrying out the functionality described herein. In another embodiment, the invention is directed to a computing device. An example of a computing device 1300 is illustrated in FIG. 13. Various embodiments are described in terms of this example of device 1300, however other computer systems or computer architectures may be used. One embodiment incorporates process 1100 in a cryptographic program. In another embodiment, process 1100 is incorporated in a hardware cryptographic device.

FIG. 13 is a diagram of one embodiment of a device utilizing an optimized cryptographic system. The system may include two devices that are attempting to communicate with one another securely. Any type of devices capable of communication may utilize the system. For example, the system may include a first computer 1301 attempting to communicate securely with a device. In one embodiment, the device is smartcard 1303. In other embodiments, devices that use the optimized cryptographic system may include, computers, handheld devices, cellular phones, gaming consoles, wireless devices, smartcards and other similar devices. Any combination of these devices may communicate using the system.

Each device may include or execute an cryptographic program 1305. The cryptographic program 1305 may be a software application, firmware, an embedded program, hardware or similarly implemented program. The program may be stored in a non-volatile memory or storage device or may be hardwired. For example, a software encryption program 1305 may be stored in system memory 1319 during use and on a hard drive or similar non-volatile storage.

System memory may be local random access memory (RAM), static RAM (SRAM), dynamic RAM (DRAM), fast page mode DRAM (FPM DRAM), Extended Data Out DRAM (EDO DRAM), Burst EDO DRAM (BEDO DRAM), erasable programmable ROM (EPROM) also known as Flash memory, RDRAM® (Rambus®) dynamic random access memory), SDRAM (synchronous dynamic random access memory), DDR (double data rate) SDRAM, DDRn (i.e., n=2, 3, 4, etc.), etc., and may also include a secondary memory (not shown).

The secondary memory may include, for example, a hard disk drive and/or a removable storage drive, representing a floppy disk drive, a magnetic tape drive, an optical disk drive, etc. The removable storage drive reads from and/or writes to a removable storage unit. The removable storage unit represents a floppy disk, magnetic tape, optical disk, etc., which is read by and written to by the removable storage drive. As will be appreciated, the removable storage unit may include a machine readable storage medium having stored therein computer software and/or data.

The cryptographic program 1305 may utilize any encryption protocol including SSL (secure sockets layer), IPsec, Station-to-Station and similar protocols. In one example embodiment, the encryption program may include a Diffie-Hellman key-exchange protocol or an RSA encryption/decryption algorithm.

The encryption program 1305 may include a secret key generator 1309 component that generates a secret key for a key-exchange protocol. The cryptographic program 1309 may also include an agreed key generator 1307 component. The agreed key generator 1307 may utilize the secret key from the encryption component 1313 of the device 1303 in communication with the computer 1301 running the cryptographic program 1305. Both the secret key generator 1309 and the agreed key generator 1307 may also utilize a public prime number and a public base or generator. The public prime and base or generator are shared between the two communicating devices (i.e., computer 1301 and smartcard 1303).

The cryptographic program may be used for communication with devices over a network 1311. The network 1311 may be a local area network (LAN), wide area network (WAN) or similar network. The network 1311 may utilize any communication medium or protocol. In one example embodiment, the network 1311 may be the Internet. In another embodiment, the devices may communicate over a direct link including wireless direct communications.

Device 1301 may also include a communications interface (not shown). The communications interface allows software and data to be transferred between computer 1301 and external devices (such as smartcard 1303). Examples of communications interfaces may include a modem, a network interface (such as an Ethernet card), a communications port, a PCMCIA (personal computer memory card international association) slot and card, a wireless LAN interface, etc. Software and data transferred via the communications interface are in the form of signals which may be electronic, electromagnetic, optical or other signals capable of being received by the communications interface. These signals are provided to the communications interface via a communications path (i.e., channel). The channel carries the signals and may be implemented using wire or cable, fiber optics, a phone line, a cellular phone link, a wireless link, and other communications channels.

In one example embodiment, an encryption component 1313 may be part of a smartcard 1303 or similar device. The encryption component 1313 may be software stored or embedded on a SRAM 1315, implemented in hardware or similarly implemented. The encryption component may include a secret key generator 1309 and agreed key generator 1307.

In alternative embodiments, the secondary memory may include other ways to allow computer programs or other instructions to be loaded into device 1301, for example, a removable storage unit and an interface, Examples may include a program cartridge and cartridge interface (such as that found in video game devices), a removable memory chip or card (such as an EPROM (erasable programmable read-only memory), PROM (programmable read-only memory), or flash memory) and associated socket, and other removable storage units and interfaces which allow software and data to be transferred from the removable storage unit to device 1301.

In this document, the term "computer program product" may refer to the removable storage units, and signals. These computer program products allow software to be provided to device 1301. Embodiments of the invention may be directed to such computer program products. Computer programs (also called computer control logic) are stored in memory 1319, and/or the secondary memory and/or in computer program products. Computer programs may also be received via the communications interface. Such computer programs, when executed, enable device 1301 to perform features of embodiments of the present invention as discussed herein. In particular, the computer programs, when executed, enable computer 1301 to perform the features of embodiments of the present invention. Such features may represents parts or the entire blocks 1005, 1010, 1015, 1020, 1025, 1030, 1035, 1040, 1045, 1050, 1060, 1065 and 1070 of FIGS. 11A and 11B. Alternatively, such computer programs may represent controllers of computer 1301.

In an embodiment where the invention is implemented using software, the software may be stored in a computer program product and loaded into device 1301 using the removable storage drive, a hard drive or a communications interface. The control logic (software), when executed by computer 1301, causes computer 1301 to perform functions described herein.

Computer 1301 and smartcard 1303 may include a display (not shown) for displaying various graphical user interfaces (GUIs) and user displays. The display can be an analog electronic display, a digital electronic display a vacuum fluorescent (VF) display, a light emitting diode (LED) display, a plasma display (PDP), a liquid crystal display (LCD), a high performance addressing (HPA) display, a thin-film transistor (TFT) display, an organic LED (OLED) display, a heads-up display (HUD), etc.

In another embodiment, the invention is implemented primarily in hardware using, for example, hardware components such as application specific integrated circuits (ASICs) using hardware state machine(s) to perform the functions described herein. In yet another embodiment, the invention is implemented using a combination of both hardware and software.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known circuits, structures and techniques have not been shown in detail to avoid obscuring the understanding of this description.

Embodiments of the present disclosure described herein may be implemented in circuitry, which includes hardwired circuitry, digital circuitry, analog circuitry, programmable circuitry, and so forth. These embodiments may also be implemented in computer programs. Such computer programs may be coded in a high level procedural or object oriented programming language. The program(s), however, can be implemented in assembly or machine language if desired. The language may be compiled or interpreted. Additionally, these techniques may be used in a wide variety of networking environments. Such computer programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosure may also be considered to be implemented as a machine-readable or machine recordable storage medium, configured for use with a processing system, where the storage medium so configured causes the processing system to operate in a specific and predefined manner to perform the functions described herein.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

What is claimed is:

1. A method in an elliptic curve cryptographic system comprising:
   pre-computing, for encryption, a multiplication routine according to an input operand length using one iteration graph-based multiplication;
   computing, by a computing device, a first carry-less product of two input operands according to the pre-computed multiplication routine; and
   computing, by the computing device, a second carry-less product between the first carry-less product and a sparse polynomial by performing a number of SHIFT and Exclusive-OR operations,
   where the sparse polynomial comprises a plurality of coefficients and the number of coefficients of the plurality equal to one is smaller than the number of coefficients of the plurality equal to 0, and the number of SHIFT and Exclusive-OR operations is in the order of the number of coefficients of the plurality equal to I in a polynomial defining an elliptic curve binary field.

2. The method of claim 1 further comprises:
   computing a third carry-less product between the second carry-less product and a second sparse polynomial by performing a number of SHIFT and Exclusive-OR operations, where the second sparse polynomial comprises a plurality of coefficients and the number of coefficients of the plurality equal to one is smaller than the number of coefficients of the plurality equal to 0, and the number of SHIFT and Exclusive-OR operations is in the order of the number of coefficients of the plurality equal to 1 in a polynomial defining an elliptic curve binary field.

3. The method of claim 2, wherein the third carry-less product comprises:
   computing a cryptographic key according to a remainder $p(x)$ using the following equation as:

$$p(x)=c(x)\cdot x^t \bmod g(x)$$

where:
   $c(x)$ is a polynomial of degree $s-1$ with coefficients in $GF(2)$, representing the s most significant bits of a carry-less product to be reduced;
   t is the degree of the polynomial g; and
   $g(x)$ is the irreducible polynomial that defines the Elliptic Curve (EC) crypto-system.

4. The method of claim 2, wherein computing the first carry-less product further comprises:
   computing a first polynomial g* that includes t least significant terms of the programmable polynomial $g(x)$;
   computing a quotient polynomial $q^+$, where the quotient polynomial $q^+$ is of degree s and is equal to the quotient of the division of $x^{t+s}$ with the programmable polynomial;
   computing a carry-less product of the quotient polynomial and the most significant bits of the carry-less product to provide a result polynomial of the degree $2s-1$ as a first multiplication of two multiplications;
   carry-less multiplying the s most significant terms of the resulting polynomial with the first polynomial as a second multiplication of the two multiplications to accomplish the division required to compute a result polynomial of degree $t+s-2$; and
   returning the t least significant terms of the resulting polynomial as a remainder.

5. The method of claim 4, wherein computing of the carry-less product is performed using a plurality of big number shift operations and exclusive-OR operations if $g(x)$ is one of a trinomial and a pentanomial.

6. The method of claim 4, wherein the carry-less multiplying is performed using two big number shift operations and exclusive-OR operations if $g(x)$ is a trinomial.

7. The method of claim 2, wherein computing the third carry-less product comprises:
   computing a remainder $p(x)$ of the first carry-less product modulo a programmable polynomial by performing a division according to two multiplications of the following equation:

$$p(x)=L^t(g^*(x)\cdot M^s(c(x)\cdot q^+(x))),$$

where:
   $L^u(v)$ to denote the coefficients of the u least significant terms of the polynomial v and $M^u(v)$ to denote the coefficients of its u most significant terms;
   $c(x)$ is a polynomial of degree $s-1$ with coefficients in $GF(2)$, representing the s most significant bits of a carry-less product to be reduced;
   t is the degree of the polynomial g;
   $g(x)$ is the irreducible polynomial that defines the Elliptic Curve (EC) crypto-system;
   g* that includes t least significant terms of $g(x)$; and
   $q^+$ is a quotient polynomial $q^+$ where the quotient polynomial $q^+$ is of degree s and is equal to the quotient of the division of $x^{t+s}$ with the programmable polynomial $g(x)$.

8. The method of claim 1, wherein pre-computing further comprises:
   generating a plurality of graphs pertaining to a first operand and a second operand according to an input operand length, the plurality of graphs comprising a plurality of vertices and a plurality of edges;
   providing the plurality of vertices and the plurality of edges to perform multiplication of the first operand and the second operand without using recursion, wherein the first operand and the second operand have a size of at least a native operand size of the system;
   determining a first plurality of products for the plurality of vertices;
   determining a second plurality of products for a plurality of spanning edges and a plurality of spanning planes; and
   creating the plurality of coefficients from the first plurality of products and the second plurality of products for performing the multiplication of the first operand and the second operand.

9. An article of manufacture including a non-transitory machine readable storage medium having instructions encoded thereon to program an elliptic curve cryptographic system to perform a method, comprising:
   pre-computing, for encryption, a multiplication routine according to an input operand length using a one iteration graph-based multiplication;
   computing, by a computing device, a first carry-less product of two input operands according to the pre-computed multiplication routine; and
   computing, by the computing device, a second carry-less product between the first carry-less product and a sparse polynomial by performing a number of SHIFT and Exclusive-OR operations,
   where the sparse polynomial comprises a plurality of coefficients and the number of coefficients of the plurality equal to one is smaller than the number of coefficients of the plurality equal to 0, and the number of SHIFT and Exclusive-OR operations is in the order of the number of coefficients of the plurality equal to 1 in a polynomial defining an elliptic curve binary field.

10. The article of manufacture of claim 9, wherein pre-computing the multiplication routine comprises:
generating one or more graphs for an input operand length;
selecting a set of complete subgraphs from the one or more graphs;
determining a plurality of generalized edges and a plurality of vertices from the plurality of interconnected graphs, the plurality of generalized edges including a plurality of spanning edges and a plurality of spanning planes;
determining a first plurality of products for the plurality of vertices;
determining a second plurality of products for the plurality of spanning edges and the plurality of spanning planes;
creating a plurality of coefficients for a polynomial representing a product of input operands from the first plurality of products and the second plurality of products; and
providing the plurality of coefficients to a multiplication portion of an encryption process.

11. The article of manufacture of claim 9, wherein the method further comprises:
computing a third carry-less product between the second carry-less product and a second sparse polynomial by performing a number of SHIFT and Exclusive-OR operations, where the second sparse polynomial comprises a plurality of coefficients and the number of coefficients of the plurality equal to one is smaller than the number of coefficients of the plurality equal to 0, and the number of SHIFT and Exclusive-OR operations is in the order of the number of coefficients of the plurality equal to 1 in a polynomial defining an elliptic curve binary field; and
wherein third carry-less product comprises:
computing a cryptographic key according to a remainder p(x) using the following equation as:

$$p(x) = c(x) \cdot x^t \mod g(x)$$

where:
c(x) is a polynomial of degree s−1 with coefficients in GF(2), representing the s most significant bits of a carry-less product to be reduced;
t is the degree of the polynomial g; and
g(x) is the irreducible polynomial that defines the Elliptic Curve (EC) crypto-system.

12. The article of manufacture of claim 9, wherein the first plurality of products are determined for graphs having interconnecting vertices; and
wherein the second plurality of products is determined using the following equation $$P^a = \Big\{ P\big(\{ v^{(L-1)}_{(i_0) \ldots (i_{q0}) \ldots (i_{q1}) \ldots (i_{qm-1}) \ldots (i_{L-1})}, \\
v^{(L-1)}_{(i_0) \ldots (i'_{q0}) \ldots (i_{q1}) \ldots (i_{qm-1}) \ldots (i_{L-1})}, \\
v^{(L-1)}_{(i_0) \ldots (i_{q0}) \ldots (i'_{q1}) \ldots (i_{qm-1}) \ldots (i_{L-1})}, \\
v^{(L-1)}_{(i_0) \ldots (i'_{q0}) \ldots (i'_{q1}) \ldots (i_{qm-1}) \ldots (i_{L-1})}, \ldots, \\
v^{(L-1)}_{(i_0) \ldots (i'_{q0}) \ldots (i'_{q1}) \ldots (i'_{qm-1}) \ldots (i_{L-1})} \}\big) :$$

$i_j \in [o, n_j - 1] \forall j \in [0, L-1], (i'_{qk} \in [0, n_{qk} - 1] \wedge i_{qk} \neq i'_{qk})$ $\forall k \in [0, m-1],$ $0 \leq q_0 \leq q_1 \leq \ldots \leq q_{m-1}, m \in [0, L] \Big\},$ where $P^a$ represents the second plurality of products, v represents a vertex, L represents a level, q represents position and i represents a local index.

13. An elliptic curve cryptograph system comprising:
a first computer device coupled to a first memory, the first computer device to execute an encryption program in the first memory, the encryption program to perform a method comprising:
pre-computing a multiplication routine according to an input operand length using the one iteration graph-based multiplication;
computing a first carry-less product of two input operands according to the pre-computed multiplication routine; and
computing a second carry-less product between the first carry-less product and a sparse polynomial by performing a number of SHIFT and Exclusive-OR operations,
where the sparse polynomial comprises a plurality of coefficients and the number of coefficients of the plurality equal to one is smaller than the number of coefficients of the plurality equal to 0, and the number of SHIFT and Exclusive-OR operations is in the order of the number of coefficients of the plurality equal to 1 in a polynomial defining an elliptic curve binary field; and
a second computer device coupled to a second memory, the second computer device to execute the encryption program in the second memory,
wherein the first computer device and the second computer device transfer encrypted data to one another over a network.

14. The system of claim 13, the method further comprises:
computing a third carry-less product between the second carry-less product and a second sparse polynomial by performing a number of SHIFT and Exclusive-OR operations, where the second sparse polynomial comprises a plurality of coefficients and the number of coefficients of the plurality equal to one is smaller than the number of coefficients of the plurality equal to 0, and the number of SHIFT and Exclusive-OR operations is in the order of the number of coefficients of the plurality equal to 1 in a polynomial defining an elliptic curve binary field.

15. The system of claim 14, wherein the third carry-less product comprises:
computing a remainder p(x) of the first carry-less product modulo a programmable polynomial by performing a division according to two multiplications of the following equation:

$$p(x) = L^t(g(x) \cdot M^s(c(x) \cdot q^+(x))),$$

where:
$L^u(v)$ to denote the coefficients of the u least significant terms of the polynomial v and $M^u(v)$ to denote the coefficients of its u most significant terms;
c(x) is a polynomial of degree s−1 with coefficients in GF(2), representing the s most significant bits of a carry-less product to be reduced;
t is the degree of the polynomial g;
g* that includes t least significant terms of the irreducible polynomial that defines the Elliptic Curve (EC) crypto-system; and a quotient polynomial $q^+$, where the quotient polynomial $q^+$ is of degree s and is equal to the quotient of the division of $x^{r+s}$ with the programmable polynomial.

16. The system of claim 14, wherein the first memory is a double data rate (DDRn) synchronous dynamic random access memory (SDRAM), wherein n is an integer equal to or greater than 2.

17. The system of claim 14, wherein the network is one of a wired and wireless.

18. The system of claim 14, wherein the second computer device is one of a smartcard, a personal digital assistant (PDA), a cellular telephone and a gaming console.

* * * * *

UNITED STATES PATENT AND TRADEMARK OFFICE
CERTIFICATE OF CORRECTION

PATENT NO. : 8,144,864 B2  
APPLICATION NO. : 11/966572  
DATED : March 27, 2012  
INVENTOR(S) : Gueron et al.

Page 1 of 1

It is certified that error appears in the above-identified patent and that said Letters Patent is hereby corrected as shown below:

In the Specification

In column 29, at line 24 delete, "remainders" and insert -- remainder p --.

Signed and Sealed this
Eighteenth Day of November, 2014

Michelle K. Lee
*Deputy Director of the United States Patent and Trademark Office*